US008372225B2

(12) United States Patent
Bailey et al.

(10) Patent No.: US 8,372,225 B2
(45) Date of Patent: Feb. 12, 2013

(54) MACHINE AND METHOD FOR PHARMACEUTICAL AND PHARMACEUTICAL-LIKE PRODUCT ASSEMBLY

(75) Inventors: Thomas Bailey, West Midlands (GB); Ronnie Benditt, Collegeville, PA (US); Nigel Brewerton, Warwickshire (GB); Steven D. Finkelmeier, Greenfield, IN (US); Robert Glinecke, Collegeville, PA (US); Luigi Martini, Harlow (GB); Paul Simmons, West Midlands (GB)

(73) Assignee: Glaxo Group Limited, Middlesex (GB)

(*) Notice: Subject to any disclaimer, the term of this patent is extended or adjusted under 35 U.S.C. 154(b) by 872 days.

(21) Appl. No.: 12/093,817

(22) PCT Filed: Nov. 17, 2006

(86) PCT No.: PCT/US2006/061032

§ 371 (c)(1),
(2), (4) Date: May 15, 2008

(87) PCT Pub. No.: WO2007/062323

PCT Pub. Date: May 31, 2007

(65) Prior Publication Data

US 2008/0306622 A1 Dec. 11, 2008

Related U.S. Application Data

(60) Provisional application No. 60/738,283, filed on Nov. 18, 2005.

(51) Int. Cl.
*B32B 41/00* (2006.01)

(52) U.S. Cl. .............. 156/64; 156/60; 156/91; 156/350; 156/367; 156/368; 424/464; 424/465; 424/470; 424/471; 424/472; 424/474; 425/406; 425/409; 425/412; 425/413; 425/414; 425/415

(58) Field of Classification Search .................. 424/464, 424/465, 470, 471, 472, 474; 156/60, 64, 156/91, 350, 367, 378; 425/406, 409, 412, 425/413, 414, 415
See application file for complete search history.

(56) References Cited

U.S. PATENT DOCUMENTS (Continued)

FOREIGN PATENT DOCUMENTS

| | | |
|---|---|---|
| ES | 2173891 | 11/2002 |
| JP | 62133960 | 6/1987 |

(Continued)

OTHER PUBLICATIONS

Japanese Office Action dated Nov. 15, 2011 for Japanese application No. 2007-543377.

(Continued)

*Primary Examiner* — Katarzyna Wyrozebski Lee
*Assistant Examiner* — Joshel Rivera
(74) *Attorney, Agent, or Firm* — Ohlandt, Greeley, Ruggiero & Perle, LLP

(57) ABSTRACT

A method and apparatus for assembling a plurality of independently formed solid components is provided thereby forming a single delivery vehicle for a pharmaceutical or pharmaceutical-like product. The solid components can be held and fed to the apparatus via a plurality of magazines. Pusher rods and the like can be used for positioning each of the solid components. Where the components are connected via a bonding liquid, a sprayer is provided and compression pins or the like press the components with the bonding liquid together to form the final product. A rivet or other connection structure can also be used and driven through holes in each of the solid components to form the final product.

20 Claims, 30 Drawing Sheets

U.S. PATENT DOCUMENTS

| | | | | |
|---|---|---|---|---|
| 3,809,289 | A | 5/1974 | Komendowski | |
| 4,738,817 | A | 4/1988 | Wittwer et al. | |
| 4,827,780 | A | 5/1989 | Sarrine et al. | |
| 5,277,341 | A | 1/1994 | Privas | |
| 5,460,827 | A | 10/1995 | Sanderson et al. | |
| 5,508,040 | A | 4/1996 | Chen | |
| 5,824,338 | A | 10/1998 | Jacobs et al. | |
| 5,966,910 | A | 10/1999 | Ribani et al. | |
| 6,010,706 | A | 1/2000 | Candau et al. | |
| 6,170,152 | B1 | 1/2001 | Ohta et al. | |
| 7,771,334 | B2 * | 8/2010 | Bailey et al. | 493/210 |
| 2003/0190362 | A1 * | 10/2003 | Sackler et al. | 424/478 |
| 2004/0181528 | A1 | 9/2004 | Tirinato et al. | |
| 2004/0200043 | A1 | 10/2004 | Wong et al. | |
| 2005/0175696 | A1 | 8/2005 | Edgren et al. | |
| 2006/0141001 | A1 * | 6/2006 | Finkelmeier et al. | 424/422 |

FOREIGN PATENT DOCUMENTS

| | | |
|---|---|---|
| JP | 069375 | 1/1994 |
| JP | 072649 | 1/1995 |
| JP | 08501511 | 2/1996 |
| JP | 2003505498 | 2/2003 |
| JP | 2004522746 | 7/2004 |
| WO | 0108666 | 2/2001 |
| WO | 02085332 | 10/2002 |
| WO | 2006055928 | 5/2006 |

OTHER PUBLICATIONS

Colombian Office Action dated Jan. 5, 2012 for Colombian application No. 07-050.152.

Israeli Office Action dated Oct. 14, 2011 for Israeli application No. 191474.

Philippine Office Action dated Dec. 3, 2011 for Philippine application No. 12007501057.

Japanese Office Action (with English translation) dated Jun. 12, 2012 for Japanese application No. 2007-543377.

Canadian Office Action dated Jun. 21, 2012 for Canadian application No. 2,630,248.

Canadian Office Action dated Mar. 7, 2012 for Canadian application No. 2,588,418.

Indonesian Office Action dated Aug. 10, 2012 for Indonesian application No. W-00200701538.

* cited by examiner

MACHINE AND METHOD FOR PHARMACEUTICAL AND PHARMACEUTICAL-LIKE PRODUCT ASSEMBLY

CROSS REFERENCE TO RELATED APPLICATION

This application is a 371 of International Application No. PCT/US06/61032, filed 17 Nov. 2006, which claims the benefit of U.S. Provisional application No. 60/738,283, filed 18 Nov. 2005 which are incorporated herein in their entirety.

BACKGROUND OF THE INVENTION

1. Field of the Invention

The present invention relates to a machine for assembling pharmaceutical and pharmaceutical-like products. More particularly, the present invention relates to a machine that assembles a pharmaceutical or pharmaceutical-like product having a plurality of independently formed components with one or more active agents, and to the methods of assembly.

2. Description of Related Art

The delivery of active agents or medicines can be problematic because of the displeasure of swallowing or otherwise taking the medications. This is particularly true where a plurality of medications must be taken.

Contemporary methods of delivering active agents include tablets and capsules. Tablet manufacturing can include wet granulation or direct compression to add the active ingredient into the tablet ingredients. After mixing to achieve homogeneity, the tablets are formed in the desired shape.

Contemporary capsule manufacturing includes inserting an active agent, typically in powder or pellet form, into a capsule, e.g., a hard capsule made from gelatin or starch, which is then sealed, such as through application of an outer coating, or banding.

These contemporary delivery structures or vehicles suffer from the drawback of being limited to the use of compatible active agents. These vehicles are also limited to a selected release rate for the active agent or agents.

Accordingly, there is a need for a pharmaceutical product and a process for assembling a pharmaceutical product that eliminates these drawbacks of the contemporary pharmaceutical delivery structure or vehicle.

SUMMARY OF THE INVENTION

The present disclosure provides devices for assembling pharmaceutical products.

The present disclosure also provides for machines and methods of assembly of such products that allow for the delivery of a plurality of active agents.

The present disclosure further provides for machines and methods of assembly of such products that allow for greater selectivity of release rates for multiple active agents.

The present disclosure still further provides for machines for assembling such products that is simple and easy to operate.

These and other advantages, benefits, and features of the present disclosure are provided by a machine that connects a plurality of components into a single assembly. The machine applies a bonding liquid or a bonding agent to one or more of the components, and forms the assembly. The assembly can then be dispensed into a container for the user to collect. An identification system can determine the correct components to be assembled by the system and set the number of assemblies to be made.

In another aspect, the machine uses a connection structure, such as, for example, a rivet, to connect the plurality of components into a single delivery vehicle.

The above described advantages, benefits, and features of the present disclosure will be appreciated and understood by those skilled in the art from the following detailed description and drawings.

DETAILED DESCRIPTION OF THE INVENTION

Figure 1:
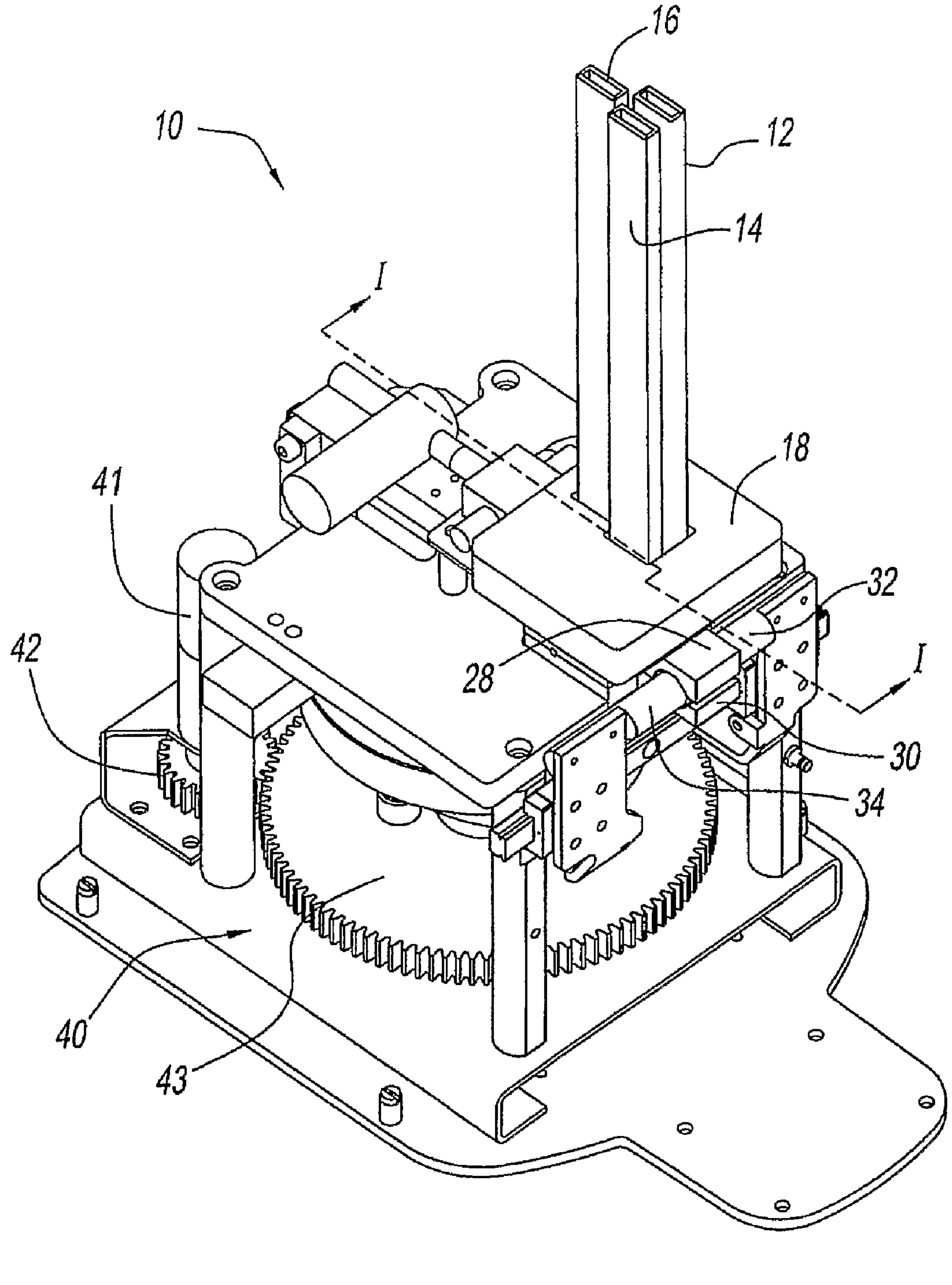
FIG. 1 is a front, top perspective view of a first embodiment of the assembly machine of the present disclosure.
Figure 2:
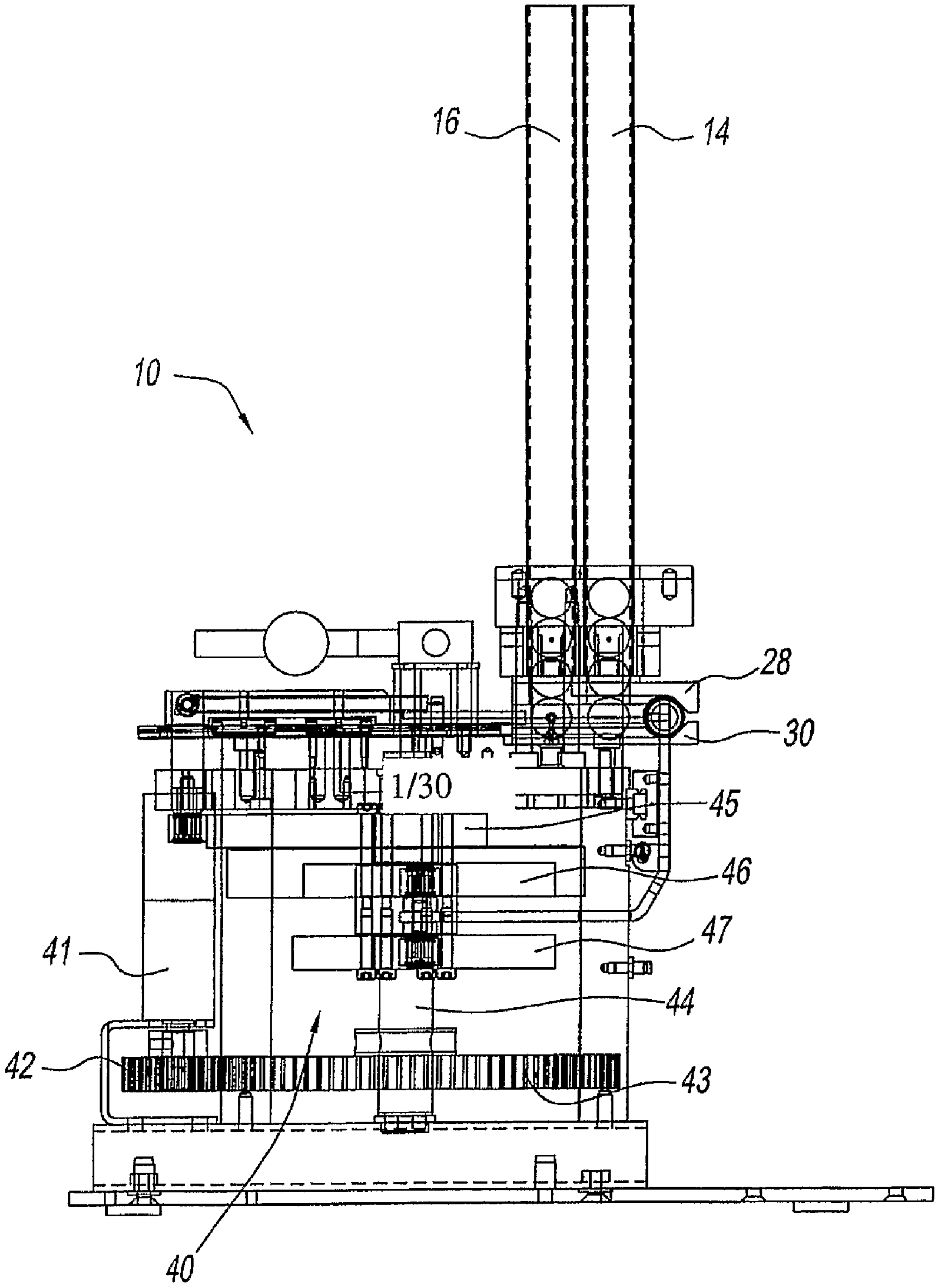
FIG. 2 is a side view, showing hidden detail, of the assembly machine shown in FIG. 1.
Figure 3:
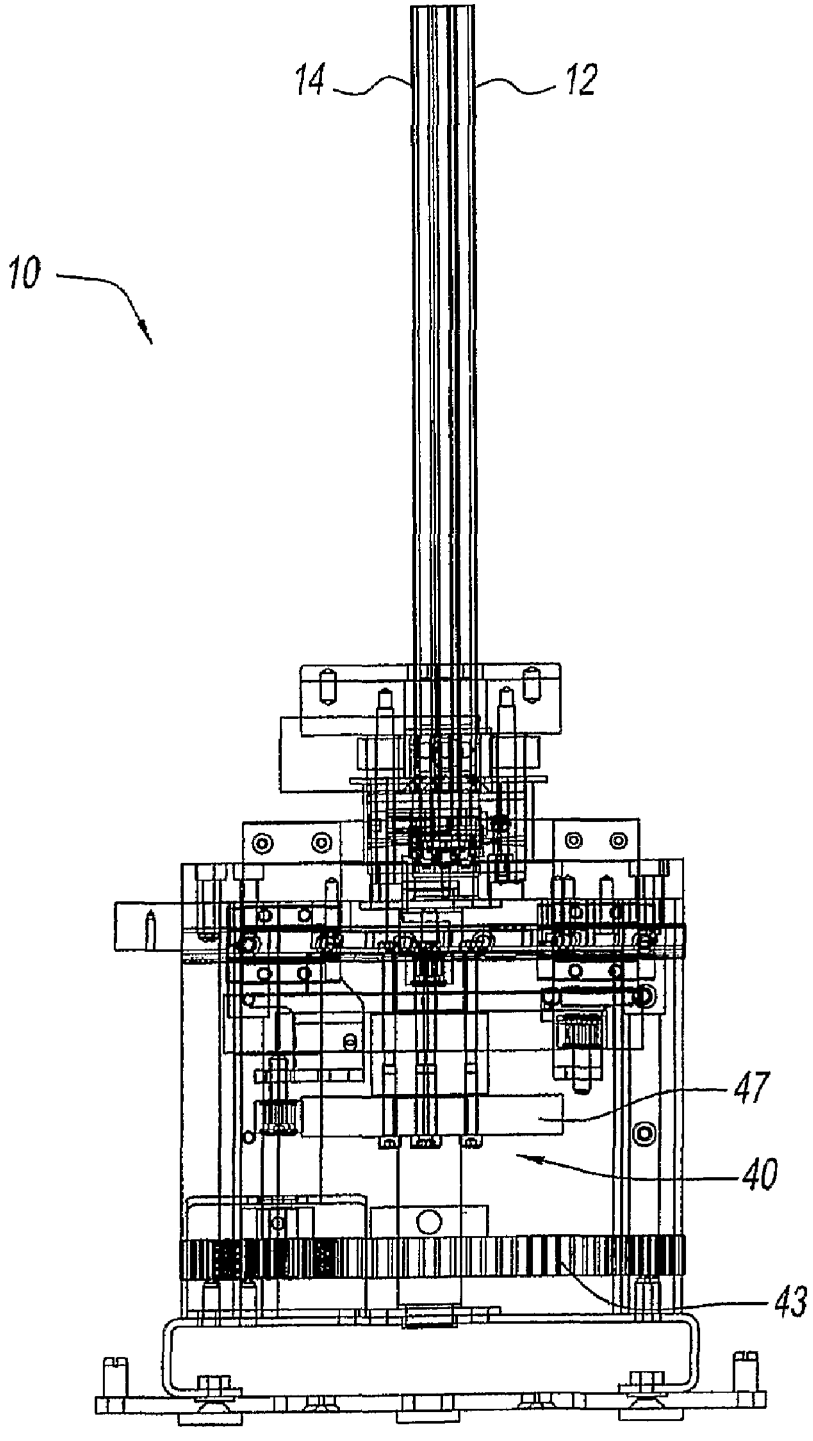
FIG. 3 is a front view, showing hidden detail, of the assembly machine shown in FIG. 1.
Figure 4:
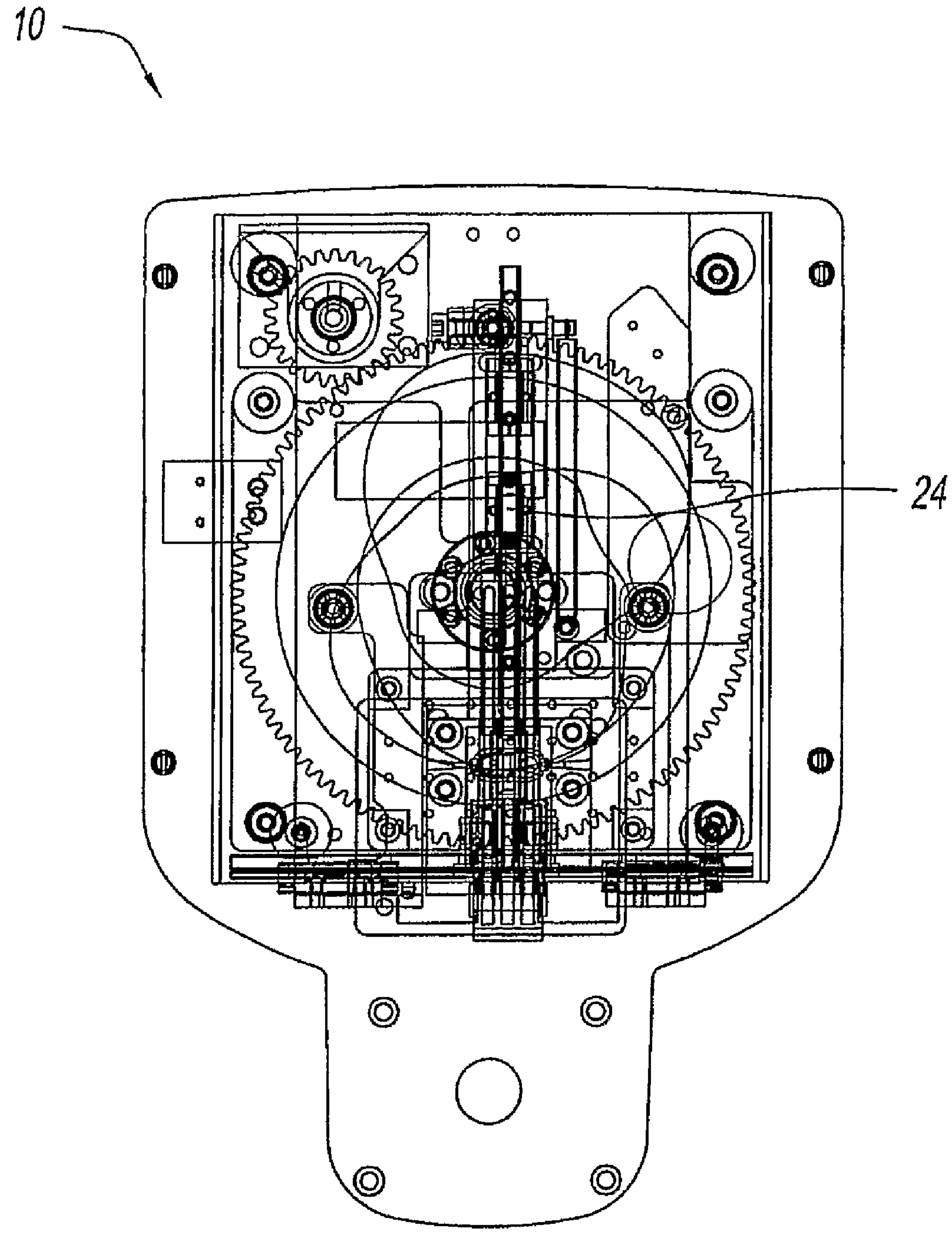
FIG. 4 is a top view, showing hidden detail, of the assembly machine shown in FIG. 1.

Referring to the figures, and, in particular, FIGS. 1 through 5, a first embodiment of the assembly machine of the present disclosure is shown, generally referred to by reference numeral 10. Assembly machine 10 preferably has right tablet or component magazine 12, left tablet or component magazine 14, and middle tablet or component magazine 16. Right, left, and middle tablet magazines 12, 14, and 16 have tablet components with one or more of the tablet components having active agents therein, and in the shown embodiment the tablets are stacked vertically. The tablet components may be loaded into the magazine by the user, or may be pre-loaded by the component vendor. In the first embodiment, the components are in circular tablet form; however, the assembly machine of the present disclosure can be adapted to form tablet assemblies out of any number of tablet shapes, including but not limited to oval, elliptical, caplet, or other shapes. Furthermore, the shown embodiments utilize three component magazines to make tablet assemblies having three components. The present disclosure, however, contemplates the use of three or more component magazines, thereby producing tablet assemblies having three or more components.

It should be further understood that the term “tablet” is not intended to be limiting, and the present disclosure contemplates machine 10 assembling various components with or without active agents into a single delivery vehicle. Detailed drawings of several pharmaceutical or pharmaceutical-like products or assemblies contemplated by the present disclosure are shown in FIGS. 39 through 47 and discussed in further detail below. It should also be understood that the terms “pharmaceutical product”, “pharmaceutical-like product”, and “active agent” are also not intended to be limiting, and the present disclosure contemplates the manufacture of various assemblies having one or more ingredients, such as, for example, nutraceuticals, vitamins, minerals, veterinarian products, personalized sports nutrition, personalized medicine, micro ingredients and/or nutritional products.

The tablet magazines are placed by the user into magazine mounting block 18, at the top of assembly machine 10. Magazine mounting block 18 holds the tablet magazines steady while the machine is in use. The magazines 12, 14 and 16 have a latch mechanism (not shown) at a bottom portion thereof, so that they only release tablets upon engagement with the reciprocal pusher 24 (shown in FIG. 4), in a manner that is discussed in further detail below. Such latch mechanisms are known in the art. Machine 10 utilizes gravity to feed the tablets. However, the present disclosure contemplates other methods and structures for feeding the tablets from one or more of the magazines 12, 14 and 16 to the assembly machine 10 (e.g., a pusher rod or the like). The movement of reciprocating pusher 24 can be controlled by an eccentric cam, as discussed in further detail below.

After the tablet magazines are placed in mounting block 18, reciprocating pusher 24 retracts from the front end of the unit, releasing tablets from the magazines 12, 14, and 16. Once a tablet is ejected from each of the magazines, spray nozzle 22 applies a bonding liquid to both sides of the tablet ejected from middle tablet magazine 16. In the exemplary embodiment, the bonding liquid used is water. However, other bonding liquids are contemplated by the present disclosure, including but not limited to, alcohol, polyethylene glycol, glycerine, polyethylene oxide polymers, such as Sentry™ POLYOX, made by Dow Chemical, methylcellulose, methylcellulose derivatives, such as hydroxypropylmethylcellulose (hypromellose), hydroxyethylcellulose, and ethylcellulose, and more specifically the Methocel series of coatings, and the Ethocel series of coatings, and other edible bonding liquids, or any combinations or mixtures thereof. It is recognized that polyethylene oxide is a water soluble resin which is listed in the NF and as used herein is available in varying molecular weights, with combinations of molecular weights for one polymer being used, such as 100K, 200K, 300K, 400K, 900K and 2000K. Sentry™ POLYOX is a water soluble resin which is listed in the NF and have approximate molecular weights from 100K to 900K and 1000K to 7000K. The tablet components may also be coated with a layer of protective material, such as Opradry®, made by Colorcon, Inc. of Pennsylvania, prior to being loaded in the magazines. The protective layer can act as a bonding agent between the tablet components when liquid is applied to the tablet from spray nozzle 22. The tablet components can also have at least two or more layers, preferably two layers, of a protective material applied thereon prior to being loaded in the magazines, so that a first layer protects the active ingredient contained in the tablet component, and the second, outer layer acts as a bonding agent when contacted with a liquid.

The method of applying the bonding liquid to the tablet through spray nozzle 22 in the shown embodiment is that of a solenoid pump. Other contact and non-contact methods of applying bonding liquid to the tablet are contemplated by the present disclosure, such as a wetting pin that touches the bonding liquid to the tablet, dipping, rolling, stamping, using an aerosol spray head, or a syringe.

Alternatively, sensors, such as optical or inductive sensors (not shown), can be placed at the end of each magazine 12, 14 and 16 to determine that a tablet has been ejected from the magazine. The signal from this sensor can be used to actuate the reciprocating pusher 24, and the various other actions the machine takes after the tablets drop, which are discussed below. These sensors can also signal a warning when a tablet is not properly ejected from one or more of the magazines 12, 14 and 16.

Figure 5:
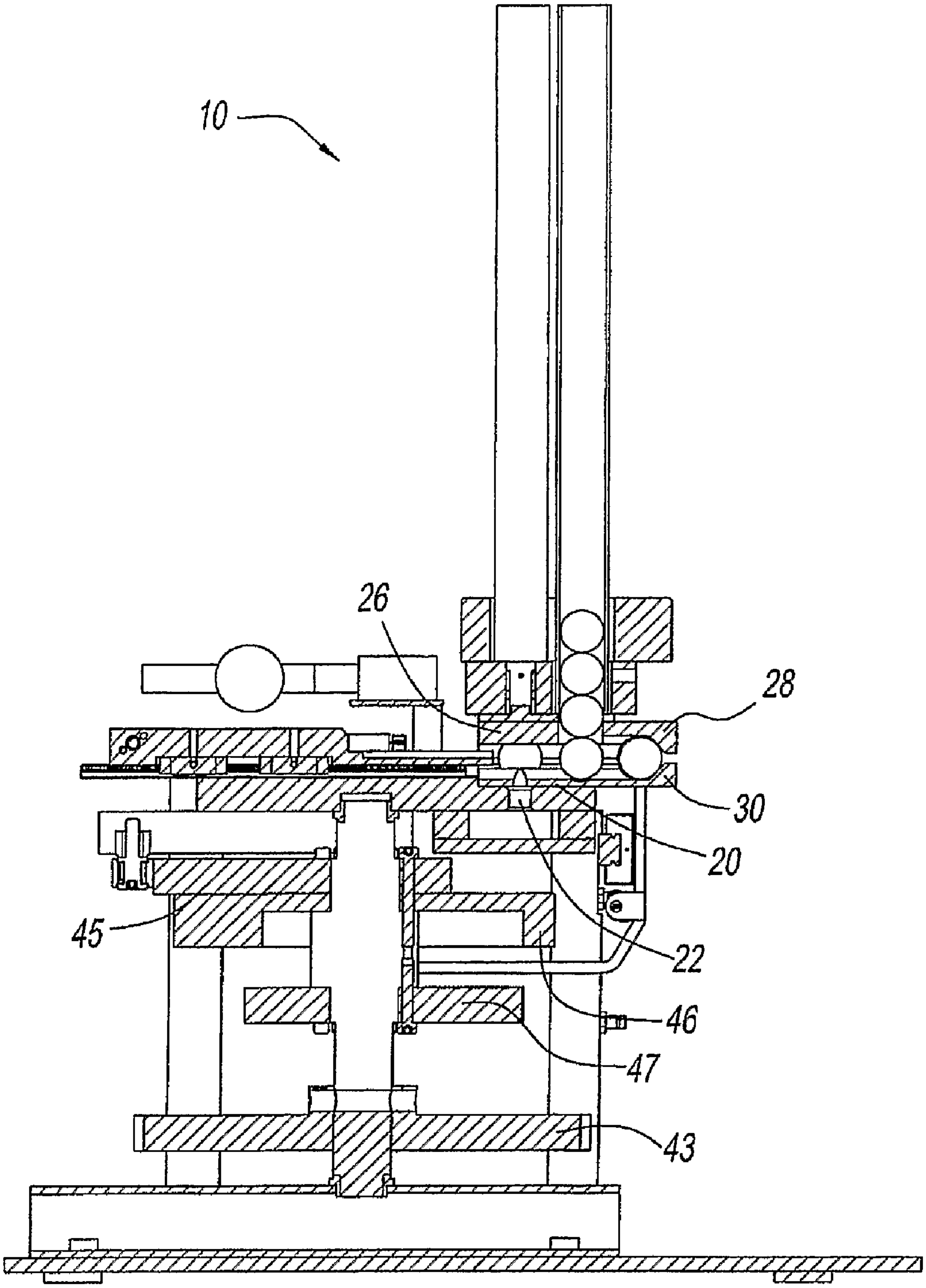
FIG. 5 is a vertical cross-sectional view, as would be seen along line I-I, of the assembly machine shown in FIG. 1.
Figure 6:
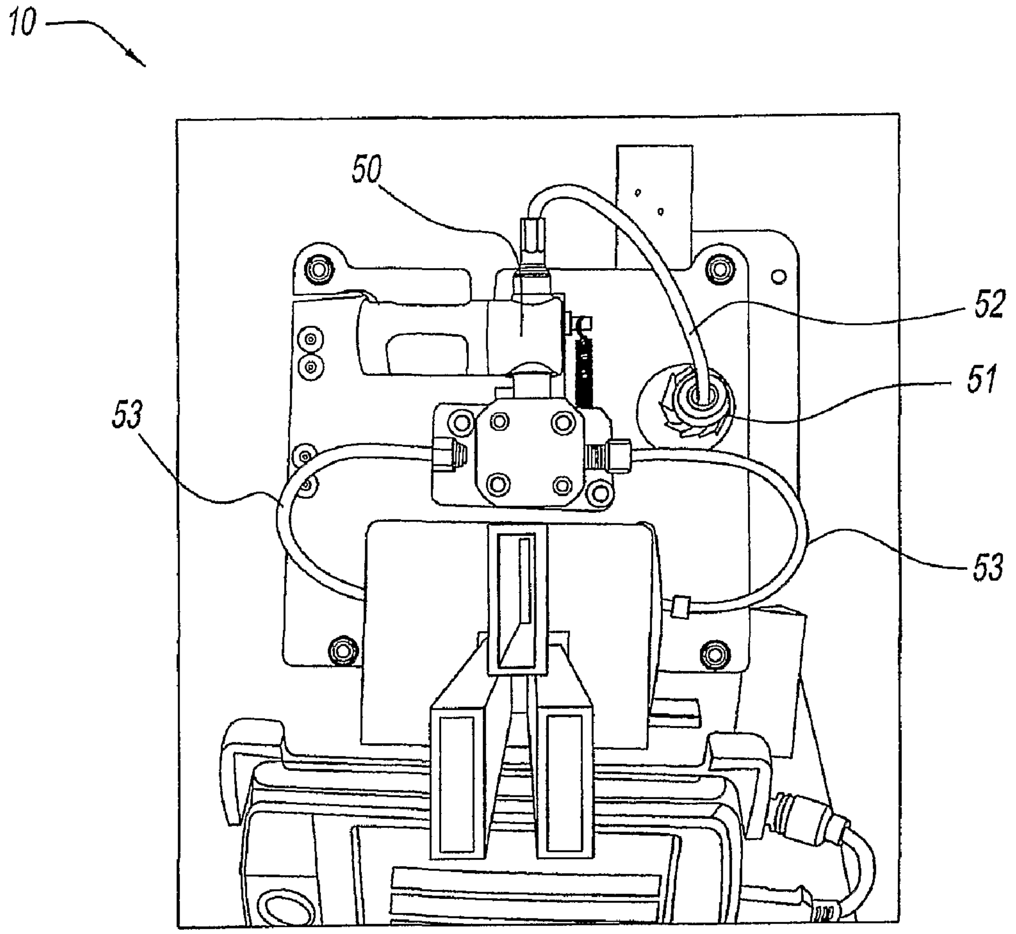
FIG. 6 is a top view of the assembly machine shown in FIG. 1, including a solenoid pump mechanism.
Figure 7:
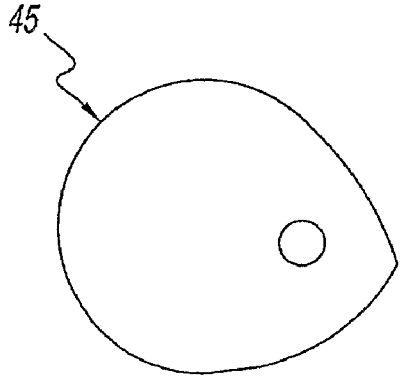
FIG. 7 is a top view of a first cam used in the assembly machine of FIG. 1.
Figure 8:
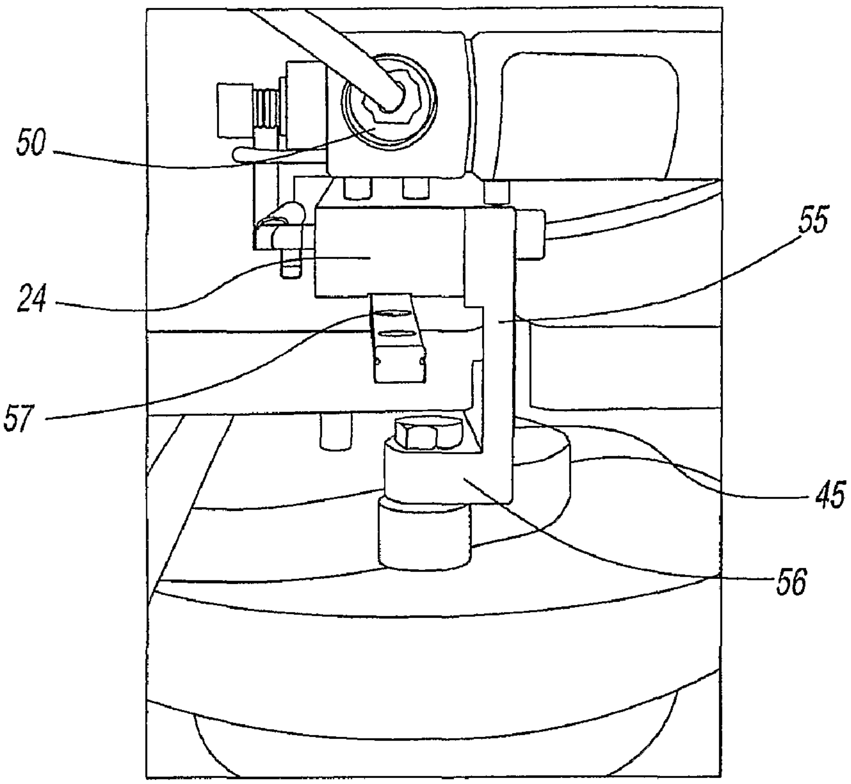
FIG. 8 is a rear view of the pusher assembly of the assembly machine shown in FIG. 1.
Figure 9:
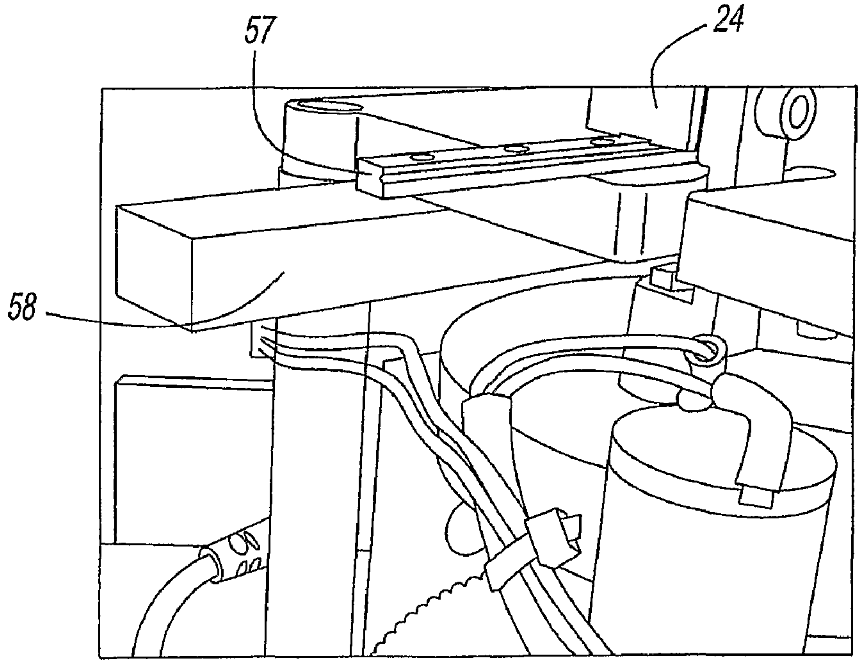
FIG. 9 is a rear, side perspective view of the pusher assembly of the assembly machine shown in FIG. 1.
Figure 10:
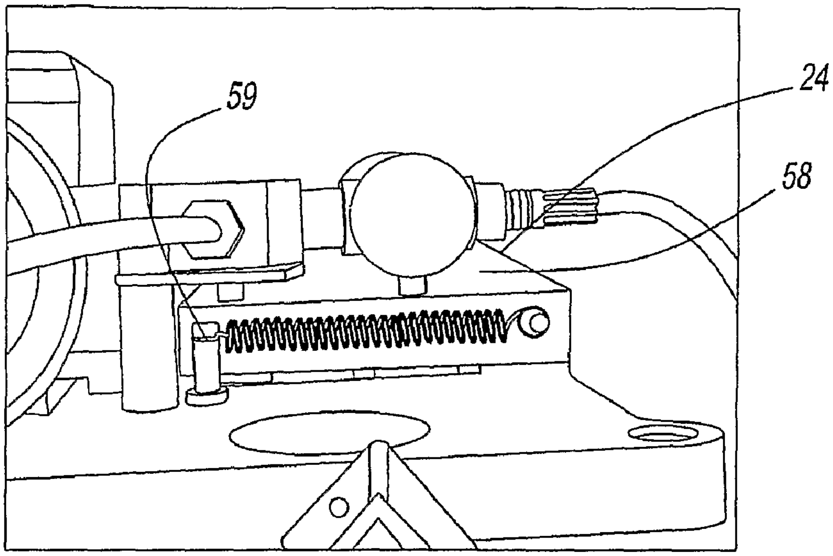
FIG. 10 is a side view of the pusher assembly of the assembly machine shown in FIG. 1.
Figure 11:
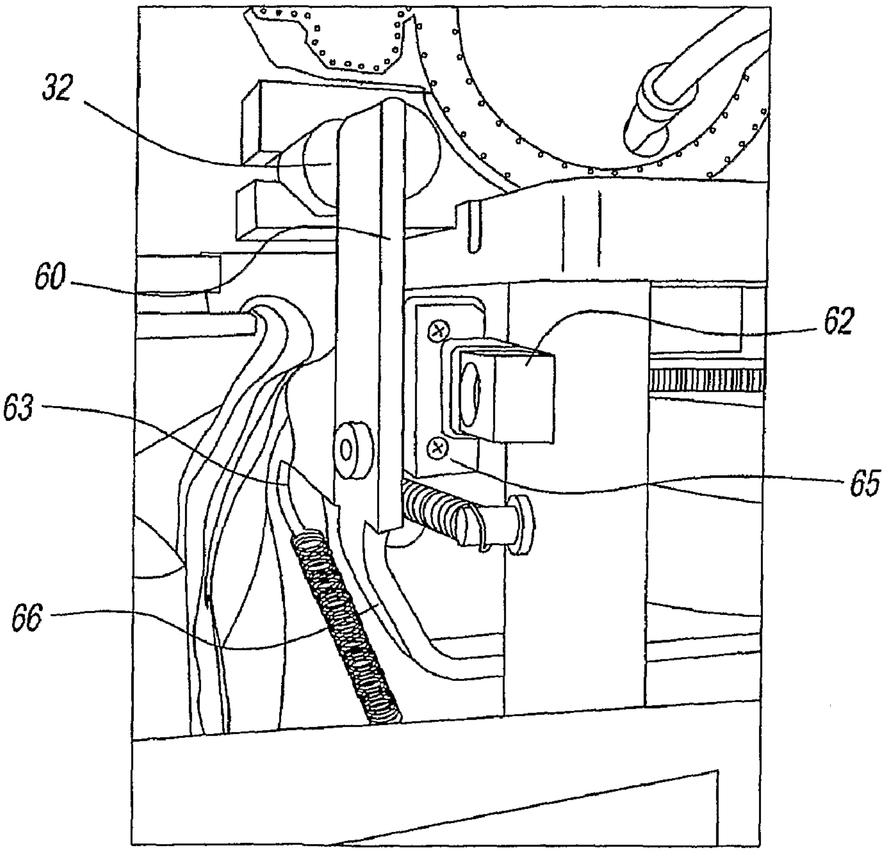
FIG. 11 is a side view of the connector assembly of the assembly machine shown in FIG. 1.
Figure 12:
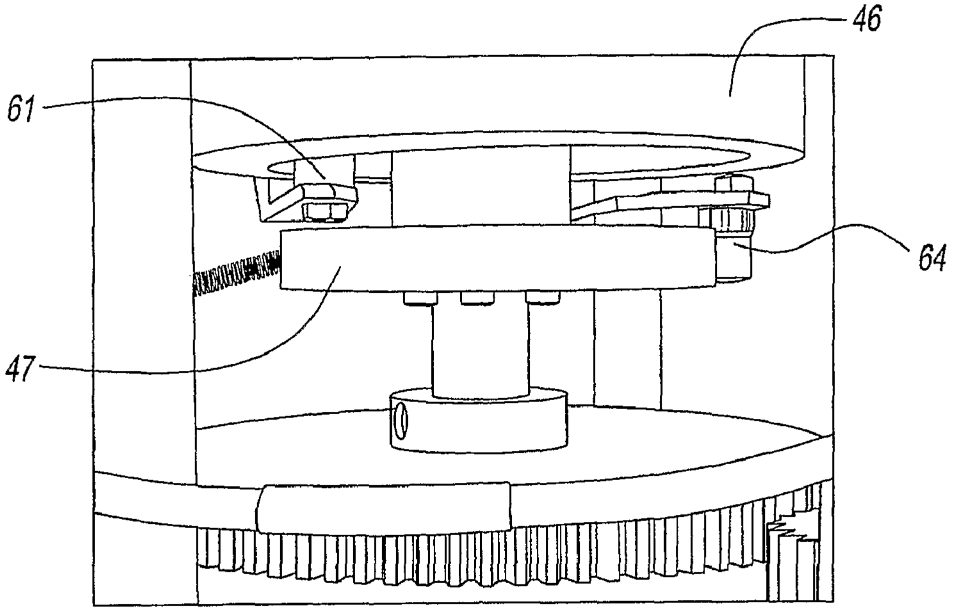
FIG. 12 is a rear view of the rotating cams of the assembly machine shown in FIG. 1.

As shown in FIG. 6, a solenoid valve 50 is operably connected to a portable vessel 51 that contains the bonding liquid. In the shown embodiment, the solenoid valve 50 is connected to the vessel 51 via a plastic tube 52. This vessel 51 can be removed and refilled as needed. When the solenoid valve 50 actuates, it draws bonding liquid from the vessel 51 and into a pair of dispensing outlets 53, where it is applied to the middle tablet through spray nozzles 22 (which are shown in FIG. 5). The actuation of the solenoid valve 50 can also be controlled by an eccentric cam, as is discussed below.

After the bonding liquid is applied to the middle tablet, reciprocating pusher 24 (shown in FIG. 4) moves the middle tablet toward the front of the machine 10, where it is aligned with the two outside tablets of the assembly. Reciprocating pusher 24 further moves the tablets toward a groove in channel bracket 26 formed by upper and lower bracket ends 28 and 30. The shape of the groove formed by upper and lower bracket ends 28 and 30 substantially conforms to the shape of the tablets (in this case circular), thus preventing any significant movement of the tablets at this point. Additionally, the tablets are held in place by reciprocating pusher 24. The present disclosure also contemplates other structures and methods for positioning and retaining the tablets.

Referring again to FIG. 1, assembly machine 10 also has right and left compression pins 32 and 34. When the three tablets (one from each of magazines 12, 14 and 16) are pushed into the groove formed by upper and lower bracket ends 28 and 30 as described above, right and left compression pins 32 and 34 actuate and press the three active agent tablets into a single assembly. The movement of the compression pins 32 and 34 can be controlled by a set of eccentric cams, as is discussed in further detail below. The bonding liquid applied to either side of the middle tablet, as described above, ensures that when the tablets are subjected to the force of the compression pins 32 and 34, they will adhere to each other. After a selected amount of pressure is applied to the tablets for a set period of time, the tablet assembly is moved by the compression pins 32 and 34 to one side of channel bracket 26 and released into a receptacle that can be collected by a user, as is discussed in further detail below. Sensors, not shown, can be optionally placed just below where the tablet assembly is released to count the assemblies being dropped into the receptacle, and to ensure that the assembly has been released by the compression pins 32 and 34. Reciprocating pusher 24 then retracts, allowing the next set of tablets to be released from the magazines 12, 14 and 16, and the cycle begins again as described above.

The moving parts in assembly machine 10 are operably connected to the transmission mechanism generally referred to by reference numeral 40. Transmission 40 is operably connected to a drive source, such as, for example, electric motor 41. Motor 41 is connected to a power source, such as, for example, an electric outlet or a battery. Transmission 40 can comprise gear mechanisms, a rack and pinion, belt drives, or eccentric cams. The motor 41 and transmission 40 provide for movement of the tablets, as well as pressing of the tablets, to form the single delivery vehicle. The particular type and size of the motor 41 can be chosen to facilitate assembly of the product. Alternatively, the present disclosure contemplates the power source being manual, such as, for example, a hand crank that is operably connected to the transmission 40.

In the shown embodiment, motor 41 is operably connected to a drive gear 42. Drive gear 42 is operably connected to secondary gear 43, which is, in turn, operably connected to a main shaft 44. Thus, during operation of assembly machine 10, motor 41 rotates drive gear 42, which rotates secondary gear 43, which in turn rotates main shaft 44. Assembly machine 10 further comprises first cam 45, second cam 46, and third cam 47, all of which are operably connected to main shaft 44. As previously discussed, first, second, and third cams 45, 46, and 47 can be operably connected to reciprocating pusher 24, and the compression pins 32 and 34, to effect the movements described above.

The movement of the reciprocating pusher 24 is mechanically driven by the eccentric cam 45. Referring to FIGS. 7 through 10, reciprocating pusher 24 is operably connected to a static pin 55, a cam follower 56, and a guide rail 57. These connections are such that when cam follower 56 follows along the tear-drop shape of eccentric cam 45 and translates this movement to reciprocating pusher 24 through static arm 55, the reciprocating pusher 24 moves along guide rail 57. As the reciprocating pusher 24 moves back on guide rail 57 in a direction away from the tablet magazines, eccentric cam 45 comes into contact with a first switch 58, which is in electronic communication with solenoid valve 50. A signal from first switch 58 actuates solenoid valve 50, which causes the dispensing of the bonding liquid onto the middle tablet in the manner described above. Reciprocating pusher 24 is then pulled back into its forward position by a spring 58 that is connected to a spring post 59, which is disposed under solenoid valve 50. The return movement of reciprocating pusher 24 is controlled by the curvature of cam 45.

Referring to FIGS. 11 through 14, compression pins 32 and 34 are controlled by the eccentric cams 46 and 47, respectively. Compression pin 32 is connected to a static arm 60, which is operably connected to a cam follower 61. Static arm 60 is also connected to a guide rail 62, which ensures that static arm 61 and therefore compression pin 32 move in a horizontal direction. Compression pin 34 (not shown in FIGS. 11 through 14) is similarly connected to static arm 63, which is operably connected to cam follower 64. Static arm 63 is also connected to guide rail 62 (not shown in drawings), thus ensuring horizontal movement of compression pin 34.

Figure 13:
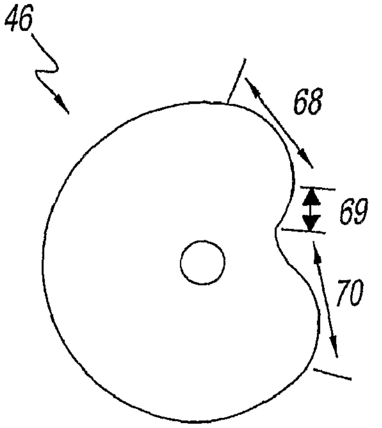
FIG. 13 is a top view of a second cam used in the assembly machine shown in FIG. 1.
Figure 14:
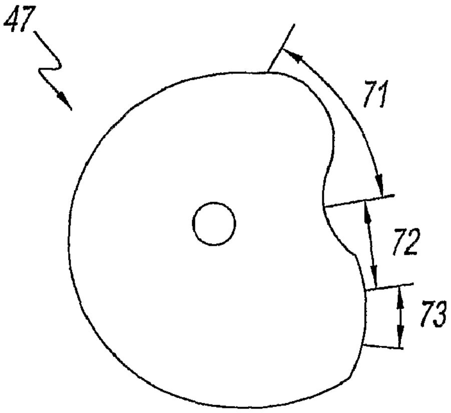
FIG. 14 is a top view of a third cam used in the assembly machine shown in FIG. 1.

As the tablet is being assembled, both pins are in start/neutral position on either side of the area where the tablet components are compressed. Referring specifically to FIGS. 13 and 14, cam 46 has first zone 68, second zone 69, and third zone 70. Cam 47 has first zone 71, second zone 72, and third zone 73. When cam follower 61 passes through first zone 68 of cam 46, the tablet assembly is being compressed. At the same time, cam follower 64 is passing through first zone 71 of cam 47. At this point, the compression pins 32 and 34 are positioned to that they apply pressure to the tablet assembly, and cams 46 and 47 pause for a sufficient time to allow proper adhesion within the tablet assembly, as is discussed in further detail below. When cam 46 resumes its rotation, cam follower 61 enters second zone 69 of cam 46. This causes compression pin 32 to move the tablet assembly in the direction of compression pin 34. At the same time, cam follower 64 enters second zone 72 of cam 47, which causes compression pin 34 to recede in a direction away from compression pin 32, and back to its own starting position. As cam 46 continues to rotate, cam follower 61 enters third zone 70 of cam 46, which moves compression pin 32 back to its original position. Cam follower 64 enters third zone 73 of cam 47, which holds compression pin 34 in its original position, causing the release of the tablet assembly. Spring 65 pulls back on static arm 60, and spring 66 pull back on static arm 66, ensuring that pins 32 ad 34 are returned to their original positions, respectively.

Figure 15:
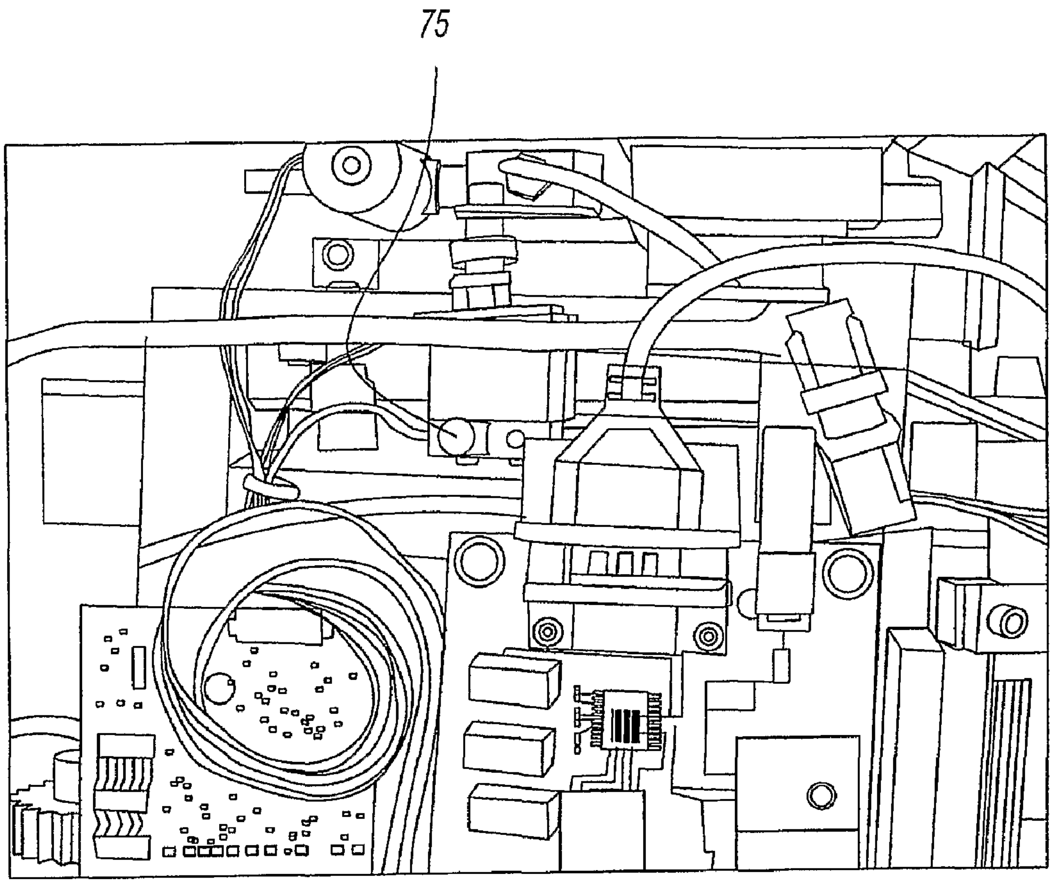
FIG. 15 is a side view of the assembly machine shown in FIG. 1.

Referring to FIG. 15, assembly machine 10 has delay switch 75. Delay switch 75 is in electronic communication with motor 41 of assembly machine 10, so that when cam 45 engages delay switch 75, the operations of assembly machine are temporarily paused so that the tablet assembly can be compressed by compression pins 32 and 34. The delay should be long enough to ensure proper adhesion between the tablet components of the assembly. In the shown embodiment, the delay is for approximately 2 seconds.

Figure 16:
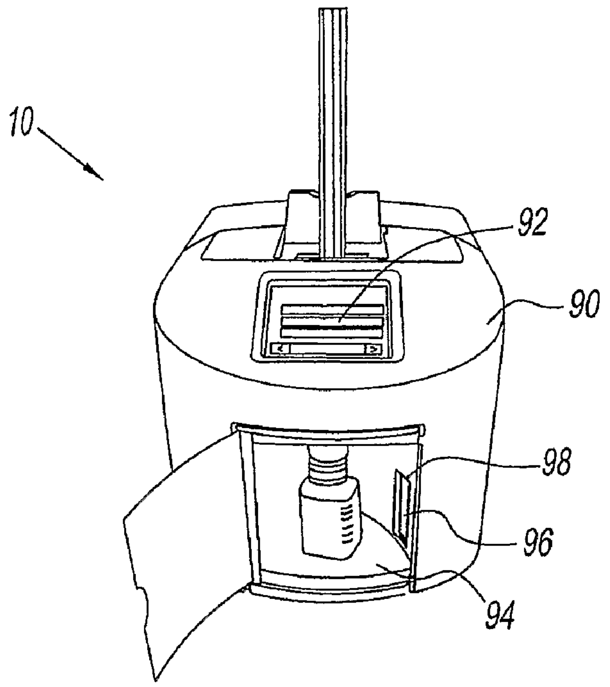
FIG. 16 is front perspective view of the assembly machine shown in FIG. 1, which is enclosed in a housing.
Figure 17:
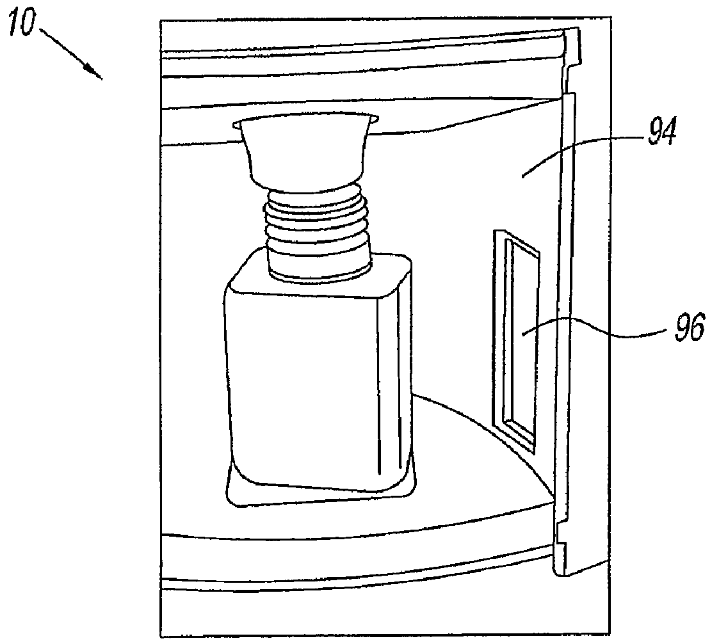
FIG. 17 is a front view of the dispensing area of the assembly machine of FIG. 1.
Figure 18:
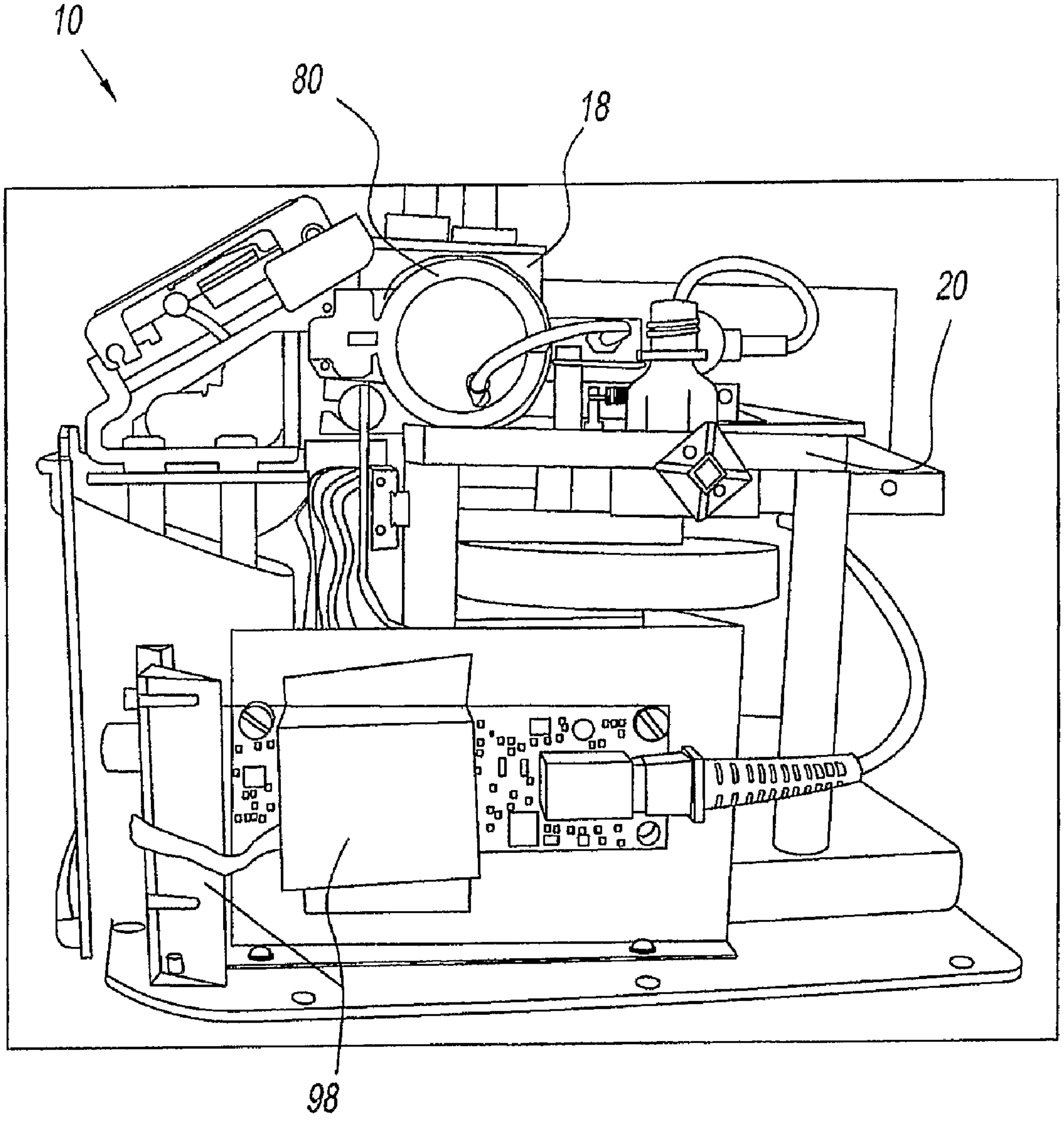
FIG. 18 is a right side view of the assembly machine of FIG. 1, including a bar code reader and an RFID antenna.

As is shown in FIGS. 16 through 18, assembly machine 10 can be encased in a housing 90 that hides all of the internal components of the machine. Housing 90 can have a interface 92, a dispensing area 94, and a bar code window 96 disposed therein. A bottle can be placed within dispensing area 94 so that the tablet assemblies fall into the open end of the bottle. With the interface 92, which comprises a plurality of touch screen controls, the user can turn the machine on and off, set the number of assemblies to be completed by the machine, and confirm that the correct tablet magazines have been placed in the assembly machine 10, as will be discussed in further detail below. The interface 92 can be any of several commercially available handheld PDA devices adapted to fit inside assembly machine 10, for example the Acer n50 Premium PDA.

The assembly machine 10 can also have a bar code reader 98, which is disposed within housing 90. Through bar code window 96, bar code reader 90 can read a bar code off of the bottle placed within dispensing area 94, and report the information obtained from the bar code to interface 92, discussed in further detail below. Bar code reader 98 can be, for example, a Data Logic Touch 65 Pro with a casing that has modified to fit inside the assembly machine housing 90. In addition, the present disclosure contemplates the use of other methods and devices to collect data contained on the bottle, such as with two-dimensional bar codes, RFID tags, or text that is disposed on the bottle, and with the appropriate devices to read such information.

Figure 19:
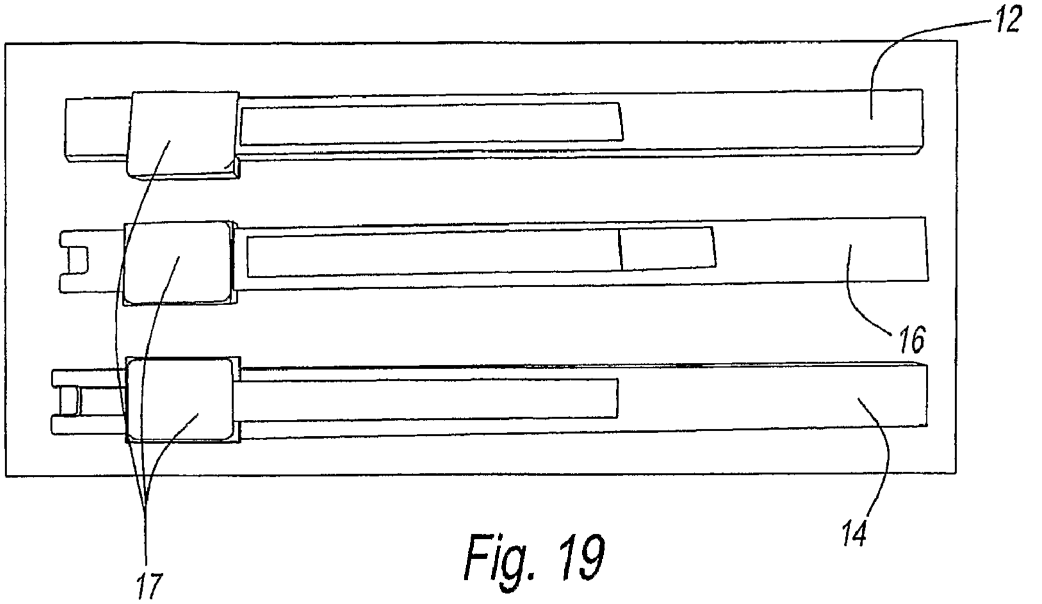
FIG. 19 is a top view of the tablet magazines that can be used in the assembly machine of FIG. 1.
Figure 20:
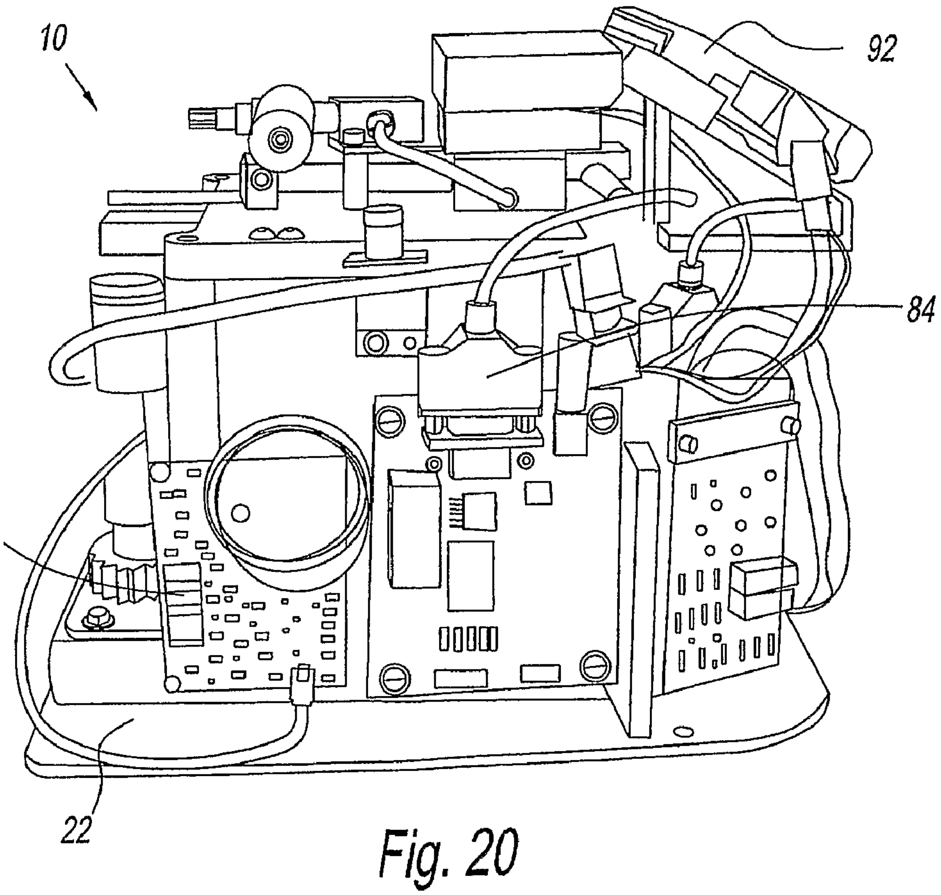
FIG. 20 is a side view of the assembly machine of FIG. 1, including an RFID module and an interface module.

Referring to FIGS. 18 through 20, assembly machine 10 can also have a radio frequency identification (RFID) system which ensures that the correct tablet magazines have been placed in the machine. Such RFID systems are well known in the art. In the present disclosure, right, left, and middle tablet magazines 12, 14, and 16 can each have an RFID tag 17 disposed thereon. RFID tags 17 contain information about the tablets contained in each magazine, such as the drug name, the strength, the shelf-life, the required position in the mounting block 18, batch data, traceability, and any other relevant information. When right, left, and middle tablet magazines 12, 14, and 16 are placed in mounting block 18, an RFID reader antenna 80 that is mounted to mounting block 18 and top plate 20 can read tags 17, and transmit the data contained in tags 17 to an RFID module 82. RFID module 82 can be mounted to base plate 22. The data obtained from RFID tags 17 can then be relayed to interface 92, through interface module 84.

Figure 21:
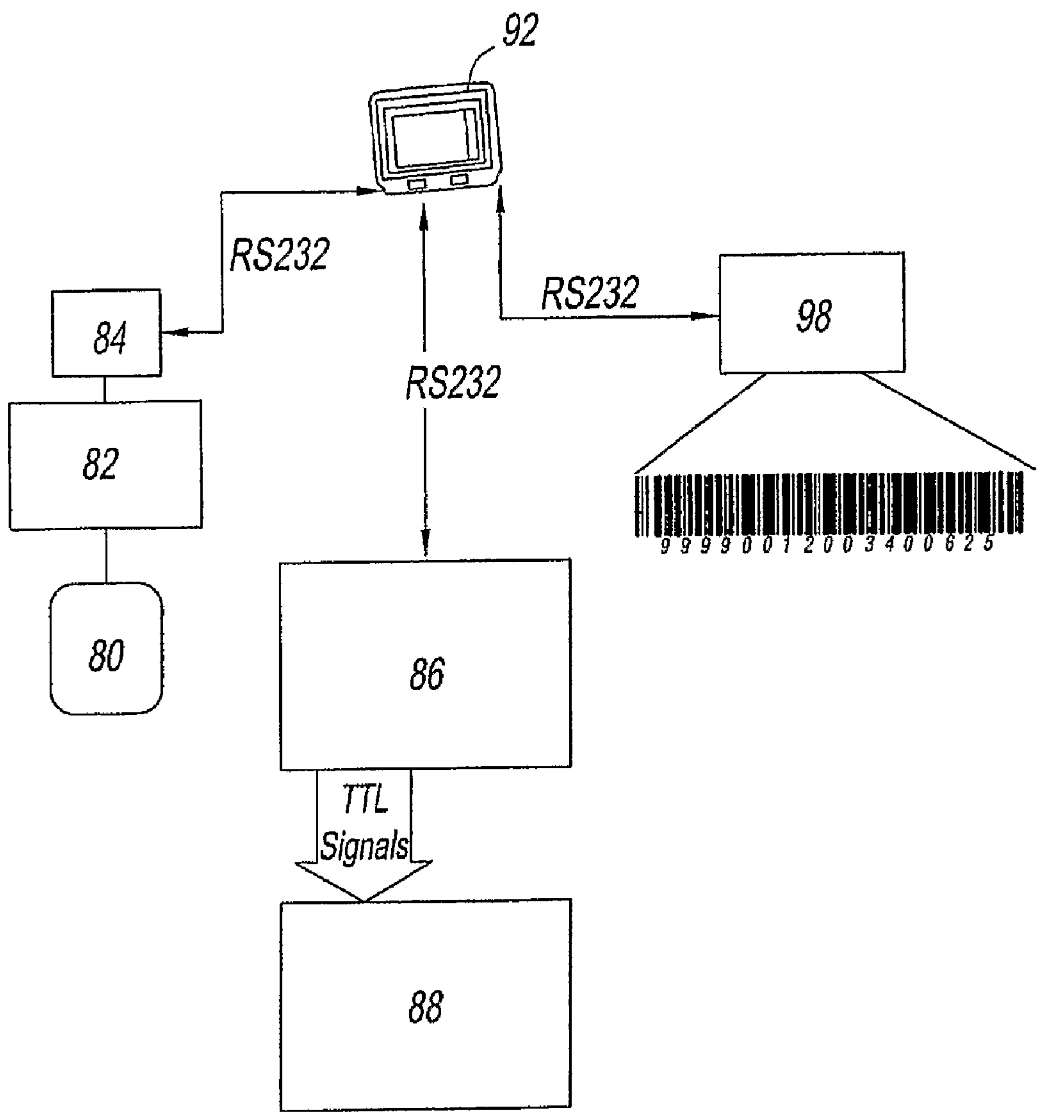
FIG. 21 is a schematic representation of the RFID, bar code reader, and microcontroller of the present disclosure.

Referring to FIG. 21, a schematic diagram for the bar code and RFID systems described above is shown. Bar code reader 98 obtains the prescription information from the label on the bottle placed in the assembly machine 10, and conveys it to interface 92 through an RS-232 serial port. The information contained in the bar code can be shown on interface 92, where the user can confirm that the information displayed is correct and matches that on the prescription. Once this has been confirmed, the user can then insert the tablet magazines 12, 14, and 16 into the assembly machine 10.

As previously discussed, RFID antenna 80 reads the data from RFID tags 17, and relays it to RFID module 82, which then communicates with interface 92 through interface module 84. The communication between interface 92 and interface module 84 can be, for example, through an RS-232 serial connection. A software program imbedded in interface 92 compares the data received from the RFID tags 17 to the information received from bar code reader 98 to make sure there is a match. If the user attempts to put incorrect tablet magazines into machine 10, the software will alert the user to this mistake and will not allow the assembly of the tablets to commence.

Interface 92 can communicate with a microcontroller 86, which in turn communicates with a controller board 88. Controller board 88 communicates with the mechanical components of the assembly machine 10, such as the motor, cam shafts, reciprocal pusher, and solenoid pump. The user of assembly machine 10 can thus manipulate the operation of the machine through the software imbedded in panel 92.

In a typical assembly process, the interface 92 would send a repeating pulse signal to the microcontroller 86. Interface 92 then checks that assembly machine 10 is "ready," i.e. that all components of the assembly machine 10 are stopped at a preferred stop position. Interface 92 can then prompt the user to insert a bottle with a barcode disposed thereon that contains all of the relevant prescription information. Interface 92 can then send a character to the barcode reader 98, which tells the reader to start reading. When reader 98 has successfully read a code and conveyed this information to interface 92, interface 92 must send another character to reader 98 to stop reading. The optimal communication parameters between interface 92 and bar code reader 98 can depend on the particular machine. Interface 92 uses the data string obtained from barcode reader 98, and a look-up table embedded in the software, to determine the drug and strength combinations that the user must select, and the number of tablet assemblies to be processed.

Interface 92 can then prompt the user for the three tablet magazines 12, 14, and 16 to be loaded, and can communicate to the microprocessor 86 how many tablet assemblies should be processed. Interface 92 can then interrogate interface module 84 to determine if the correct tablet magazines have been inserted into assembly machine 10. Visual and audio warnings can be displayed if an incorrect tablet magazine is detected. Interface 92 will thus only allow the user to start assembly machine 10 when the expected RFID data is communicated to the interface 92.

Interface 92 can then send an appropriate string to the microcontroller 86 to start processing tablet assemblies. Microprocessor 86 can keep a count of how many tablet assemblies have been completed, and report that data back to interface 92, where it can be displayed for the user. At the completion of the assembly cycle, interface 92 can display an appropriate message for the user indicating as much.

Referring to FIGS. 22 through 26, a second embodiment of the present embodiment is shown, and referred to by reference numeral 110. Assembly machine 110 functions in a similar manner to assembly machine 10, with the differences discussed below. Assembly machine 110 is designed to assemble final assemblies out of caplet-shaped products instead of the circular tablets of assembly machine 10.

Assembly machine 110 has right, left, and middle caplet magazines 112, 114, and 116, respectively. As with the above embodiment, the components may be loaded into the magazines by the user, or may be pre-loaded by the component vendor. The user inserts these magazines 112, 114, and 116, full with caplets, into magazine mounting block 118. As with the first embodiment discussed above, mounting block 118 holds the caplet magazines steady while the machine is in use. The magazines 112, 114, and 116 have releasable locks, as discussed above, so that the caplets will not release until they engage reciprocating pusher 124.

Bonding liquid is applied to the middle caplet in the same manner as described above with respect to assembly machine 10, and reciprocating pusher 124 moves the caplets toward the front of the machine. Channel bracket 126 surrounds pusher track 120 and holds the dispensed caplets in place so that there is no substantial movement after they are ejected from the magazines 112, 114, and 116. Reciprocating pusher 124 moves the caplets toward a groove in channel bracket 126 formed by upper and lower bracket ends 128 and 130. The shape of the groove formed by upper and lower bracket ends 128 and 130 substantially conforms to the shape of the caplets (in this case elliptical), thus preventing any significant movement of the caplets at this point. Additionally, the caplets are held in place by reciprocating pusher 124.

Referring again to FIG. 22, assembly machine 110 also has right side and left side compression pins 132 and 134 respectively. The tablet assemblies of assembly machine 110 are formed in a similar manner to the tablet assemblies of assembly machine 10, with the exception that the compression pins 132 and 134, and the channel bracket 126, are designed to substantially conform to the shape of the caplets used in machine 110.

Referring to FIGS. 27 through 32, a third embodiment of the assembly machine of the present disclosure is shown, referred to by reference numeral 210. The embodiment shown by assembly machine 210 is designed to fasten the plurality of component tablets together with a connecting structure such as, for example, a rivet. Assembly machine 210 operates in a similar fashion to the assembly machines of previous embodiments, with the exceptions discussed below.

Figure 27:
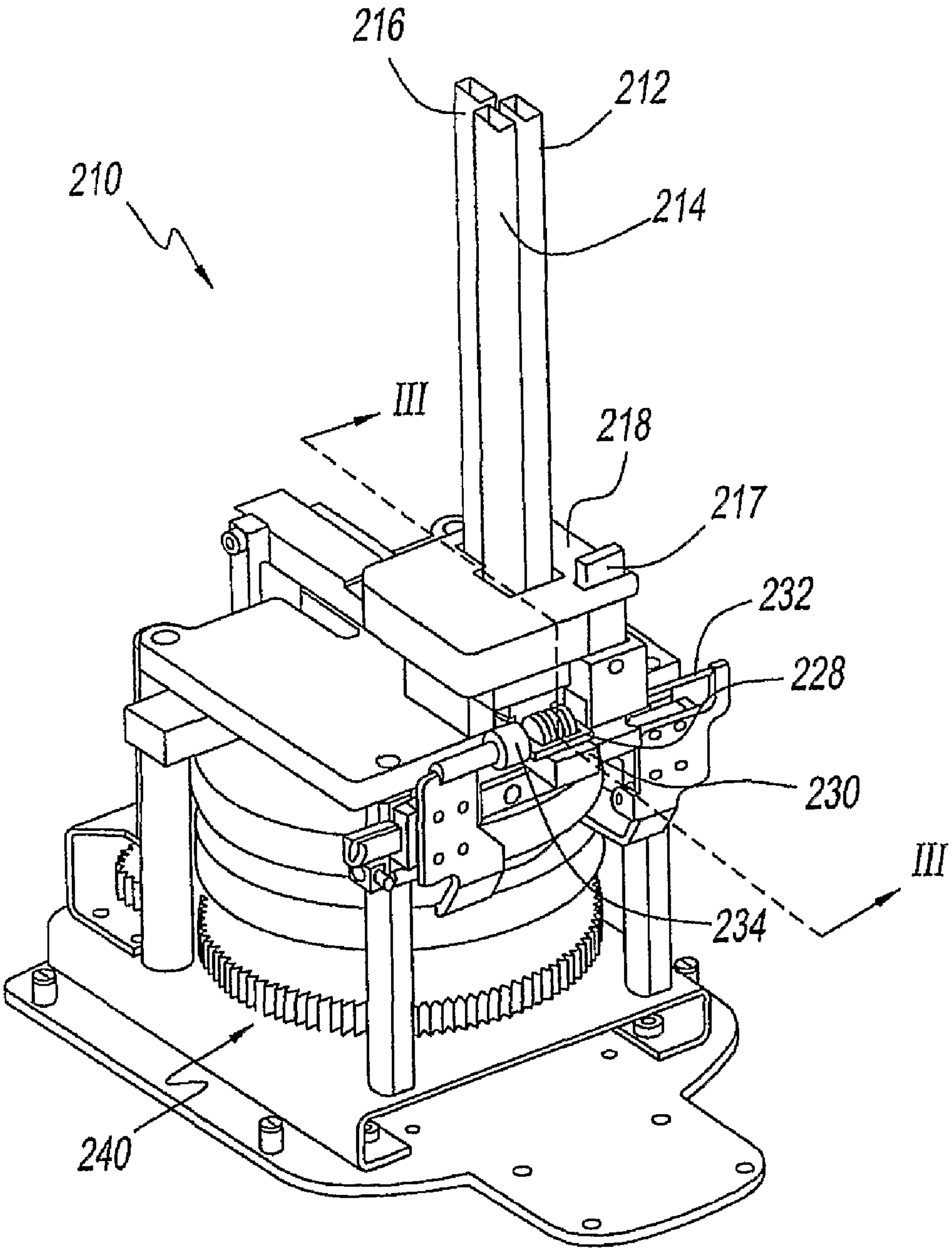
FIG. 27 is a front, top perspective view of a third embodiment of the assembly machine of the present disclosure.
Figure 28:
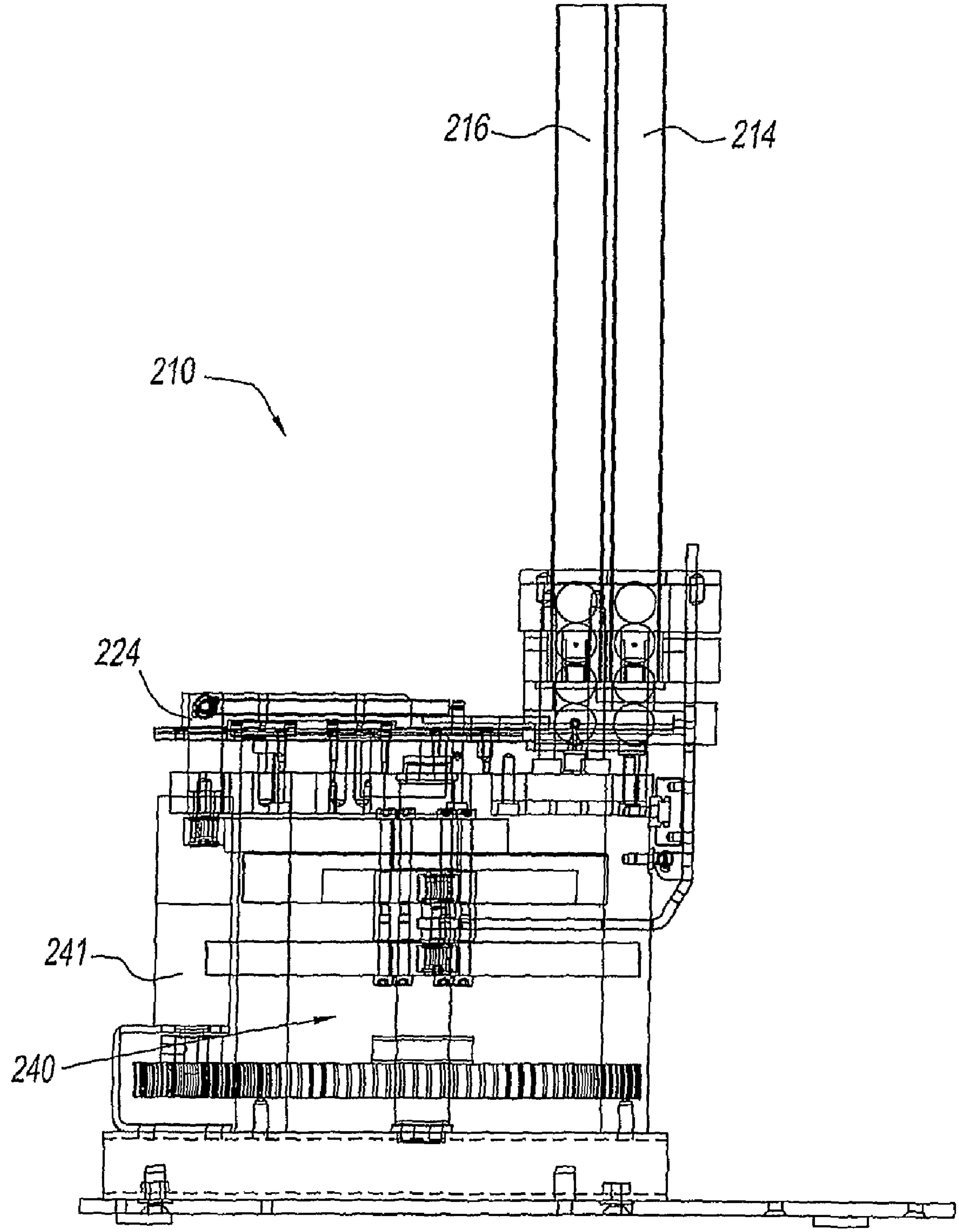
FIG. 28 is a side view, showing hidden detail, of the assembly machine shown in FIG. 27.
Figure 29:
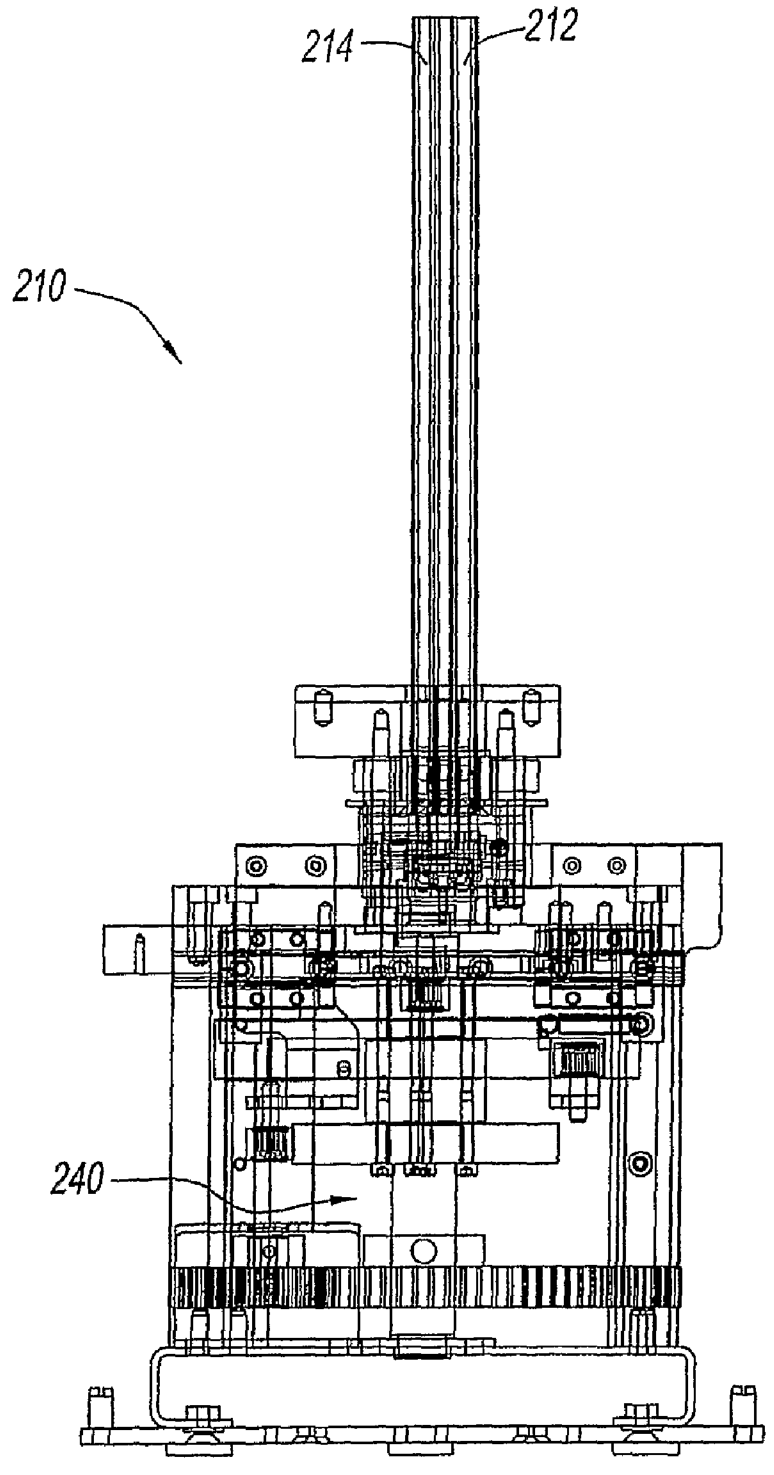
FIG. 29 is a front view, showing hidden detail, of the assembly machine shown in FIG. 27.
Figure 30:
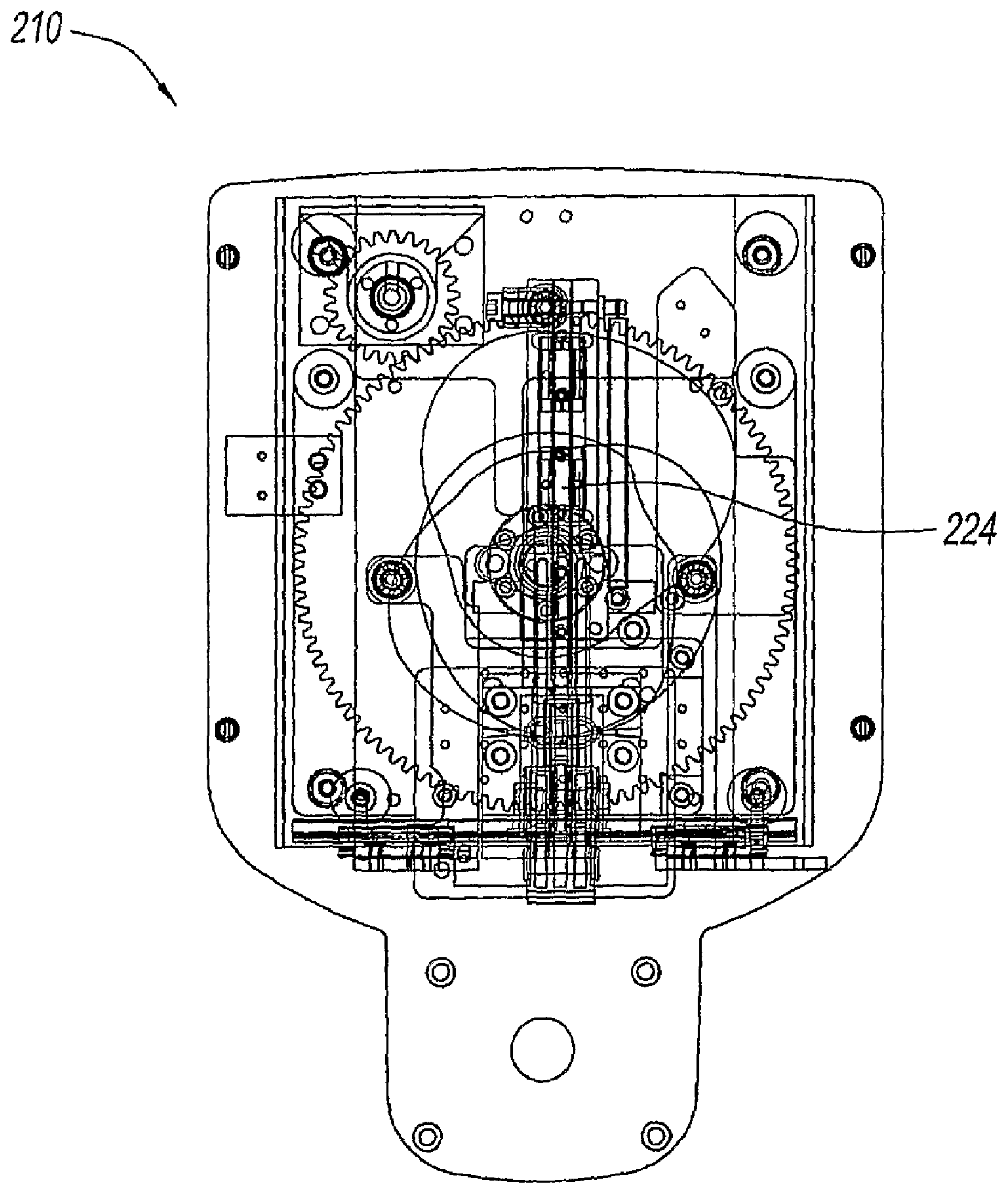
FIG. 30 is a top view, showing hidden detail, of the assembly machine shown in FIG. 27.
Figure 31:
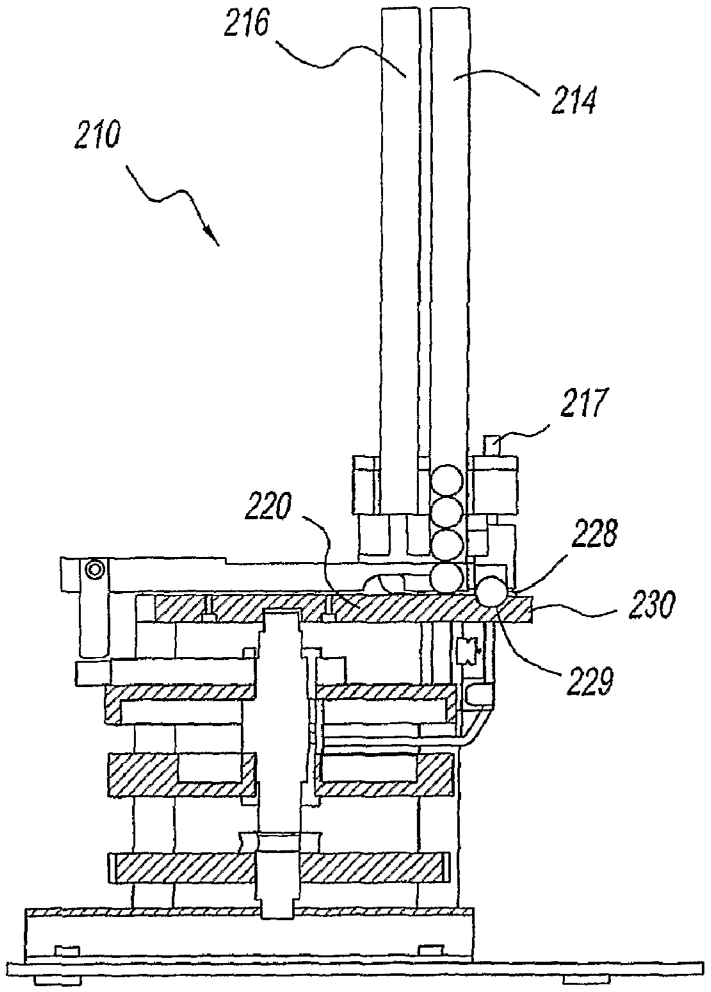
FIG. 31 is a vertical cross-sectional view, as would be seen along line III-III, of the assembly machine shown in FIG. 27.

Referring in particular to FIG. 27, assembly machine 210 has right, left, and middle tablet magazines 212, 214, and 216, respectively. As with the above embodiments, the components may be loaded into the magazine by the user, or may be pre-loaded by the component vendor. Assembly machine 210 also has rivet magazine 217, which is loaded with the rivets 2100 (FIG. 32) that will provide a mechanical connection of the plurality of components for the final tablet assembly. The user inserts these magazines 112, 114, and 116 into magazine mounting block 218. As with the first embodiment discussed above, mounting block 218 holds the magazines steady while the machine is in use. The tablet magazines 212, 214, and 216 have releasable locks so that the tablets contained therein will not release until they are engaged by the reciprocating pusher 224. Assembly machine 210 also has rivet driver 232, tablet securing bracket 228, lower block end 230, and driver base 234, all of which will be discussed in further detail below.

Figure 22:
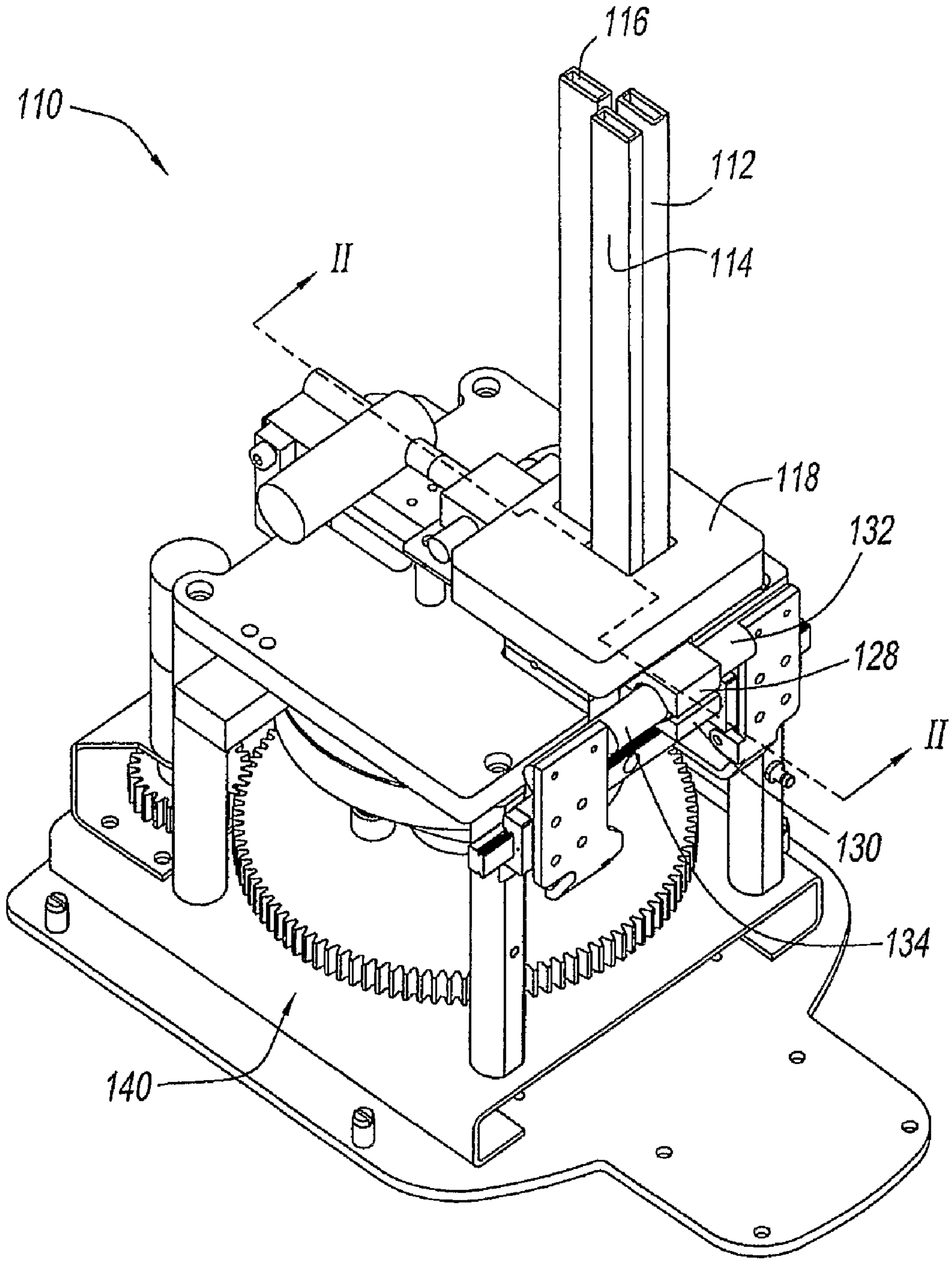
FIG. 22 is a front, top perspective view of a second embodiment of the assembly machine of the present disclosure.
Figure 23:
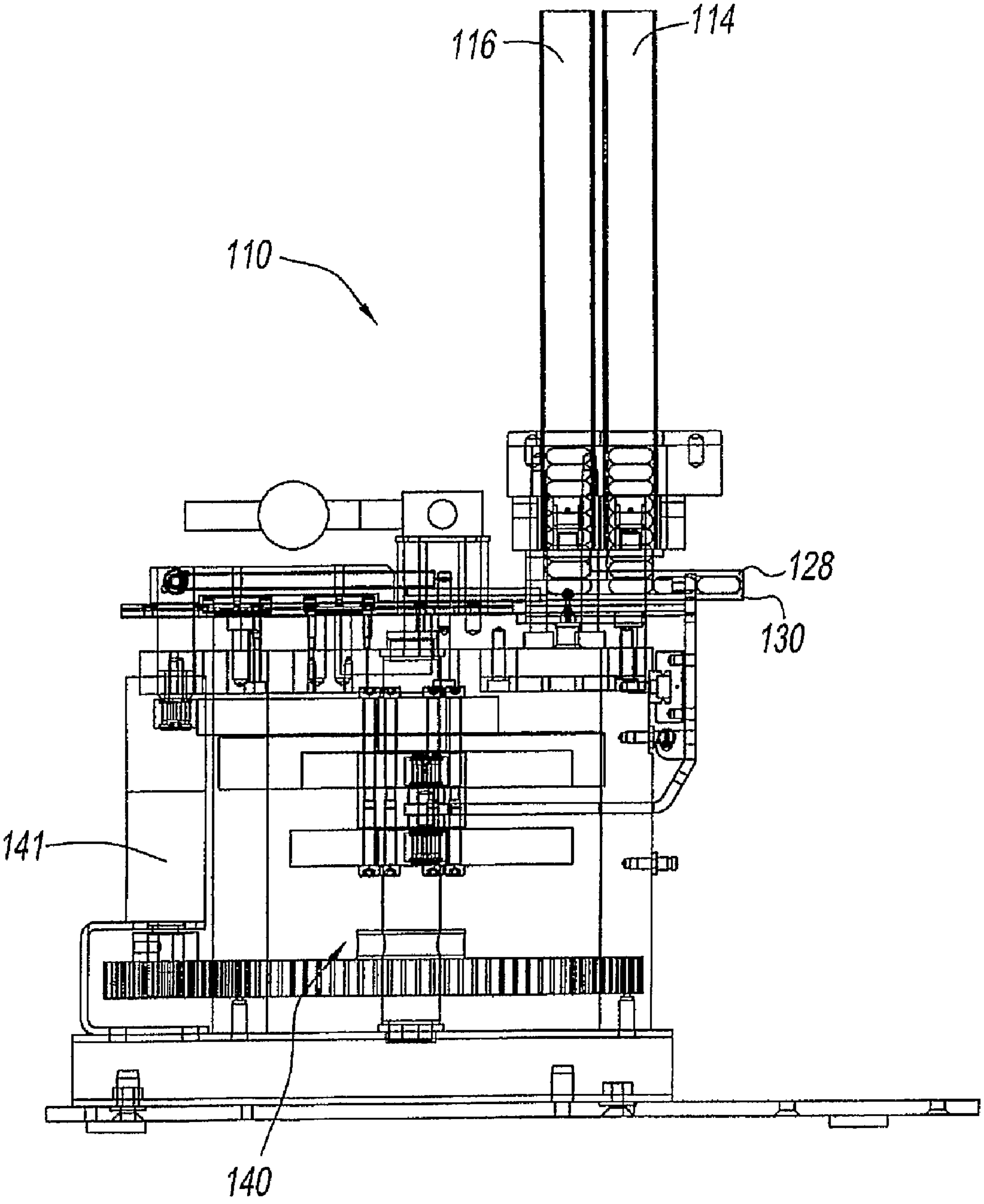
FIG. 23 is a side view, showing hidden detail, of the assembly machine shown in FIG. 22.
Figure 24:
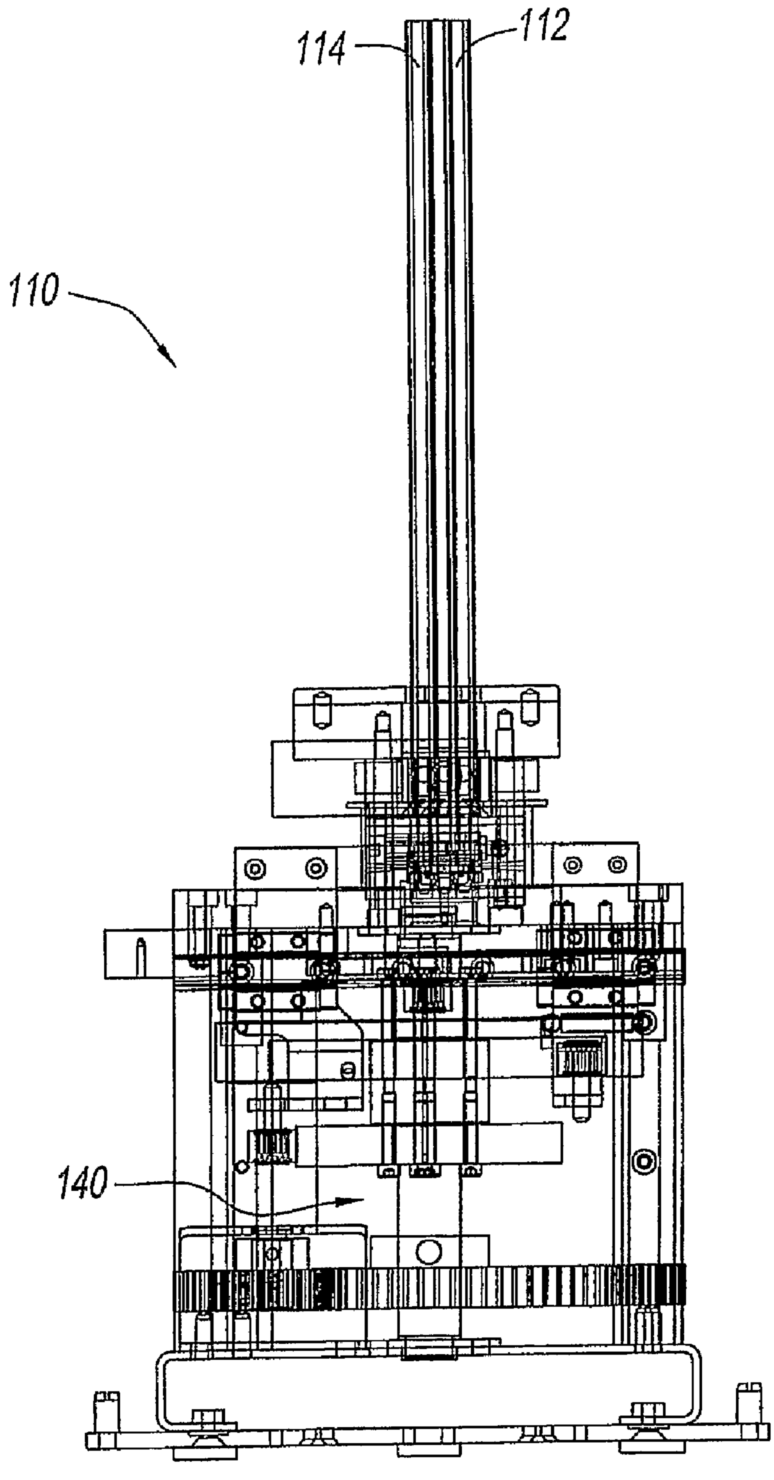
FIG. 24 is a front view, showing hidden detail, of the assembly machine shown in FIG. 22.
Figure 25:
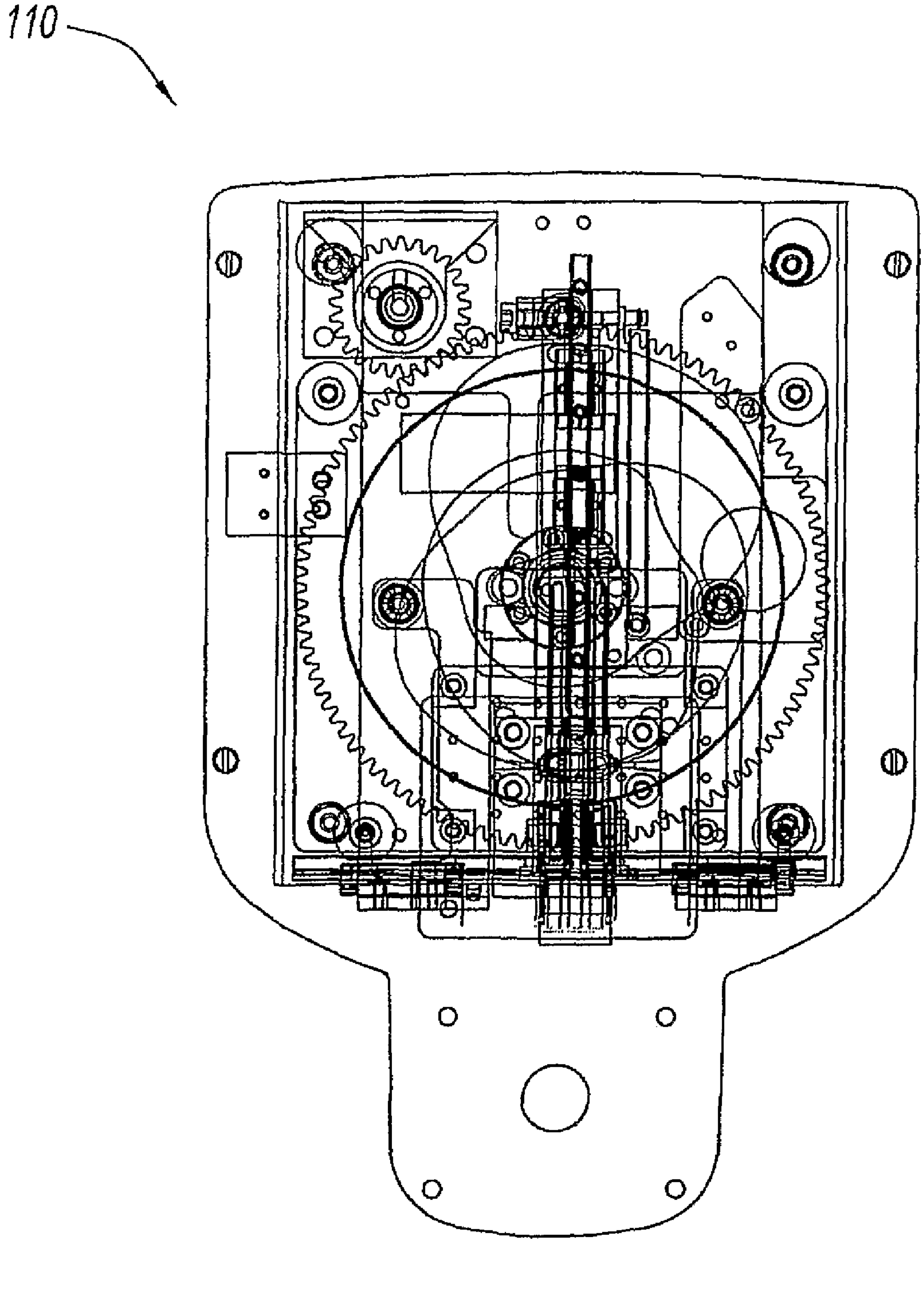
FIG. 25 is a top view, showing hidden detail, of the assembly machine shown in FIG. 22.
Figure 26:
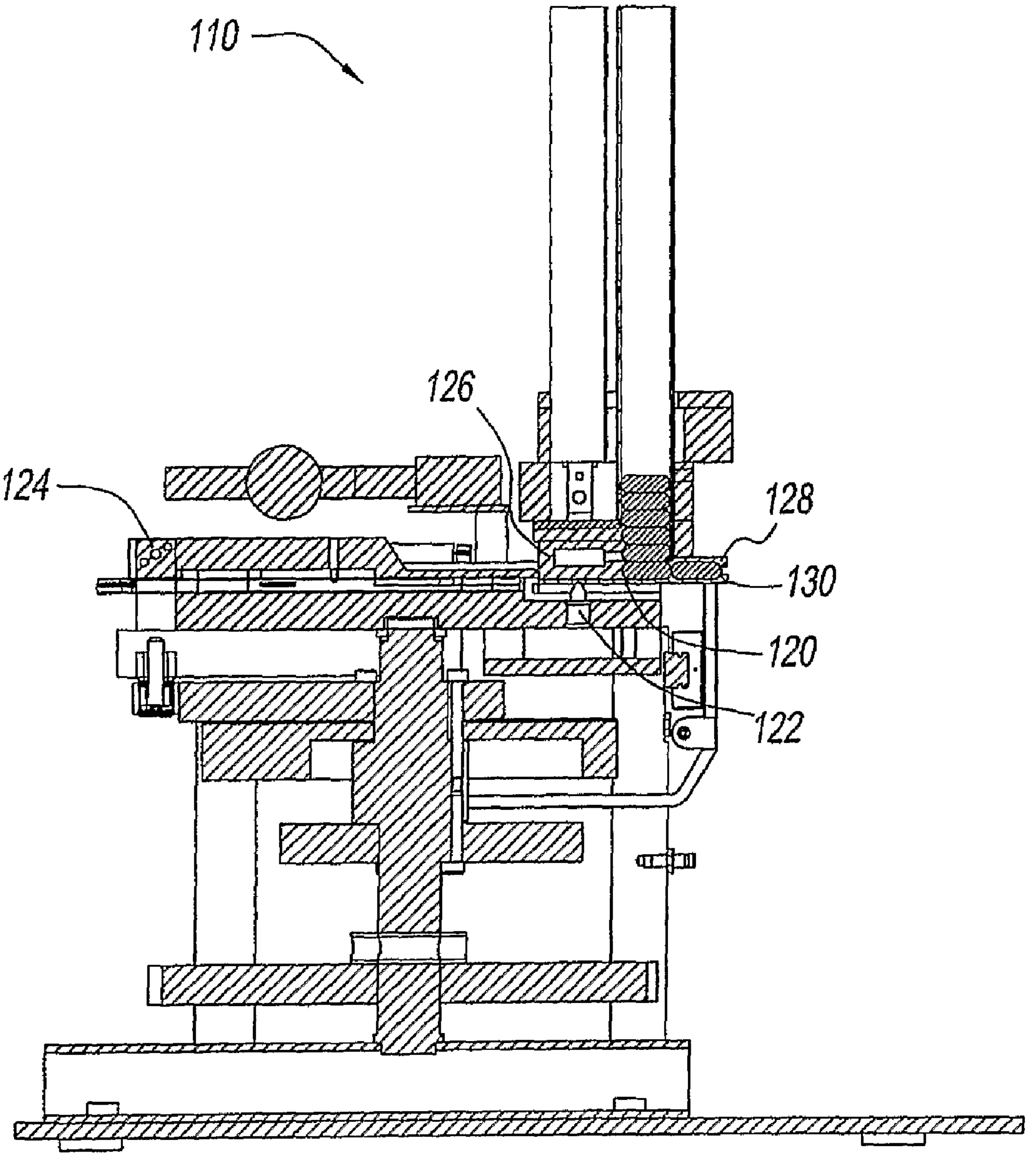
FIG. 26 is a vertical cross-sectional view, as would be seen along line II-II, of the assembly machine shown in FIG. 22.

Reciprocating pusher 224 (shown in FIG. 28) moves the tablets toward the front of the machine. Referring specifically to FIG. 22, pusher block 220 has notch 229 and lower block end 230. Notch 229 is formed in pusher block 220 near lower block end 230, and is formed with a shape that substantially conforms to the shape of the tablets. When reciprocating pusher 224 moves the dispensed tablets forward, they settle into notch 229 and are held securely in place by tablet securing bracket 228. Rivet driver 232 then actuates, pushing the rivet 2100 (FIG. 32) from rivet magazine 217 through preexisting holes in the middle of the tablets, which are being held by securing bracket 228.

Figure 32:
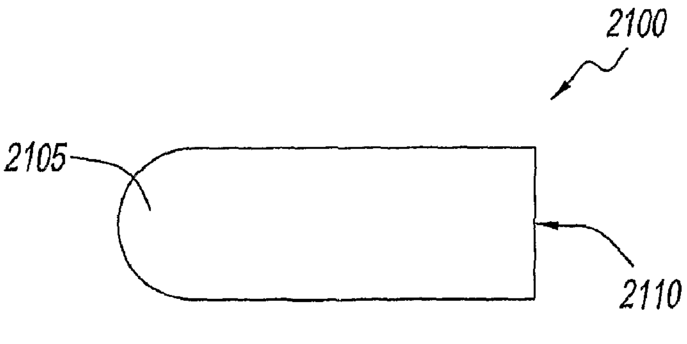
FIG. 32 is a view of the connection structure used in the assembly machine shown in FIG. 27.
Figure 33:
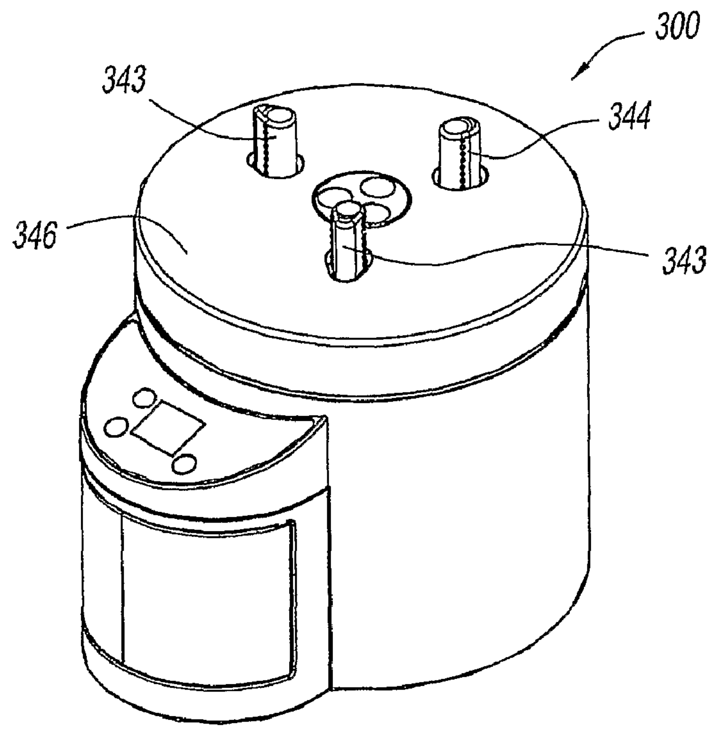
FIG. 33 is a front, side perspective view of a fourth assembly machine of the present disclosure.
Figure 34:
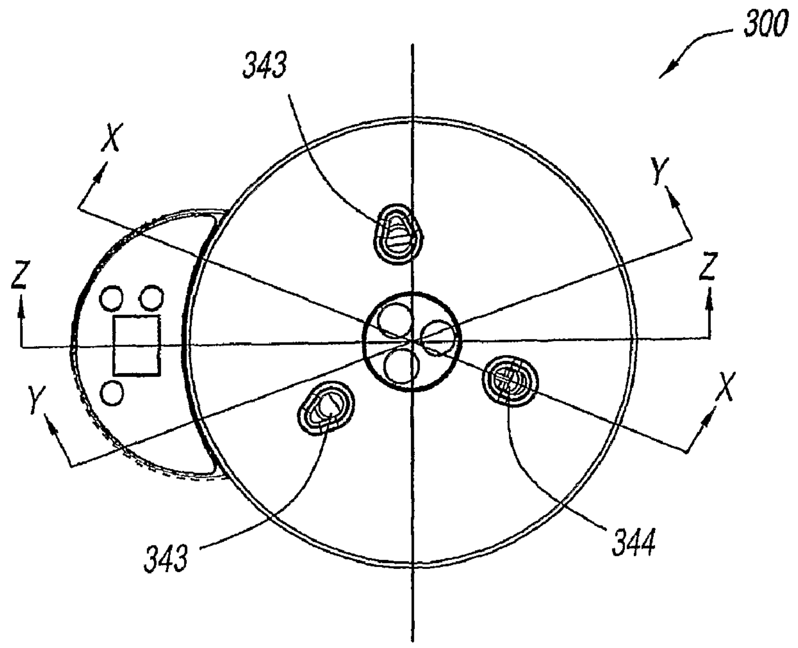
FIG. 34 is a top view of the assembly machine shown in FIG. 33.
Figure 35:
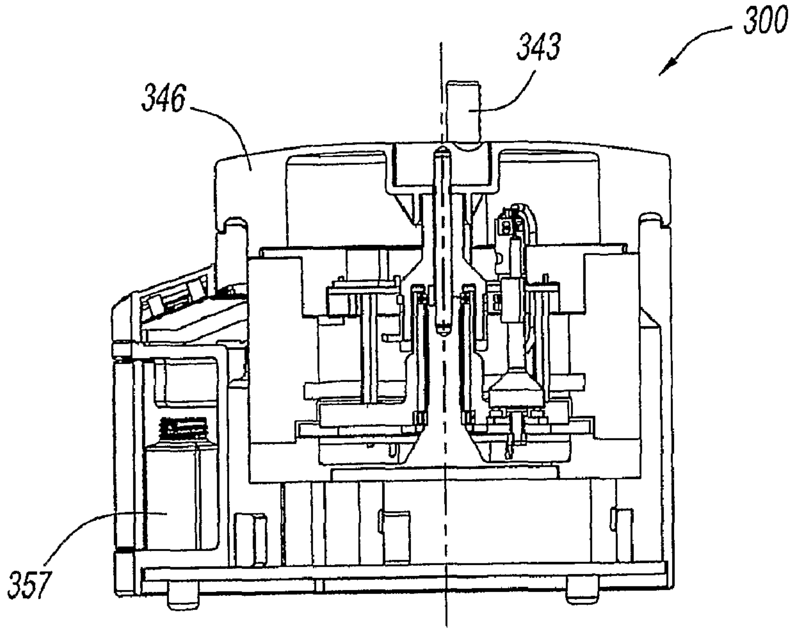
FIG. 35 is a vertical cross-sectional view, as would be seen along line Y-Y, of the assembly machine shown in FIG. 34.
Figure 36:
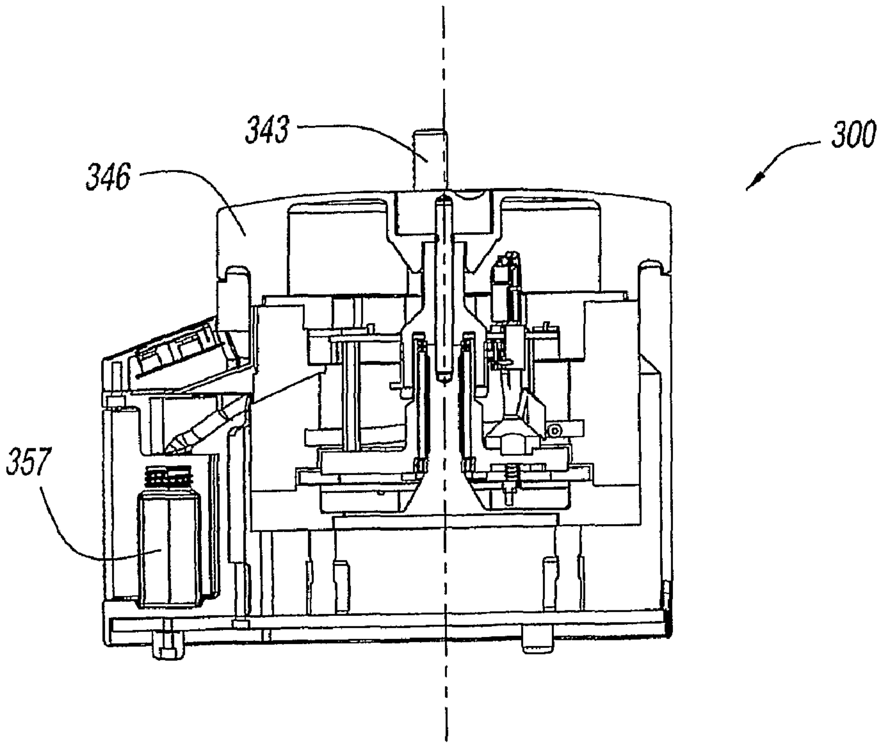
FIG. 36 is a vertical cross-sectional view, as would be seen along line Z-Z, of the assembly machine shown in FIG. 34.
Figure 37:
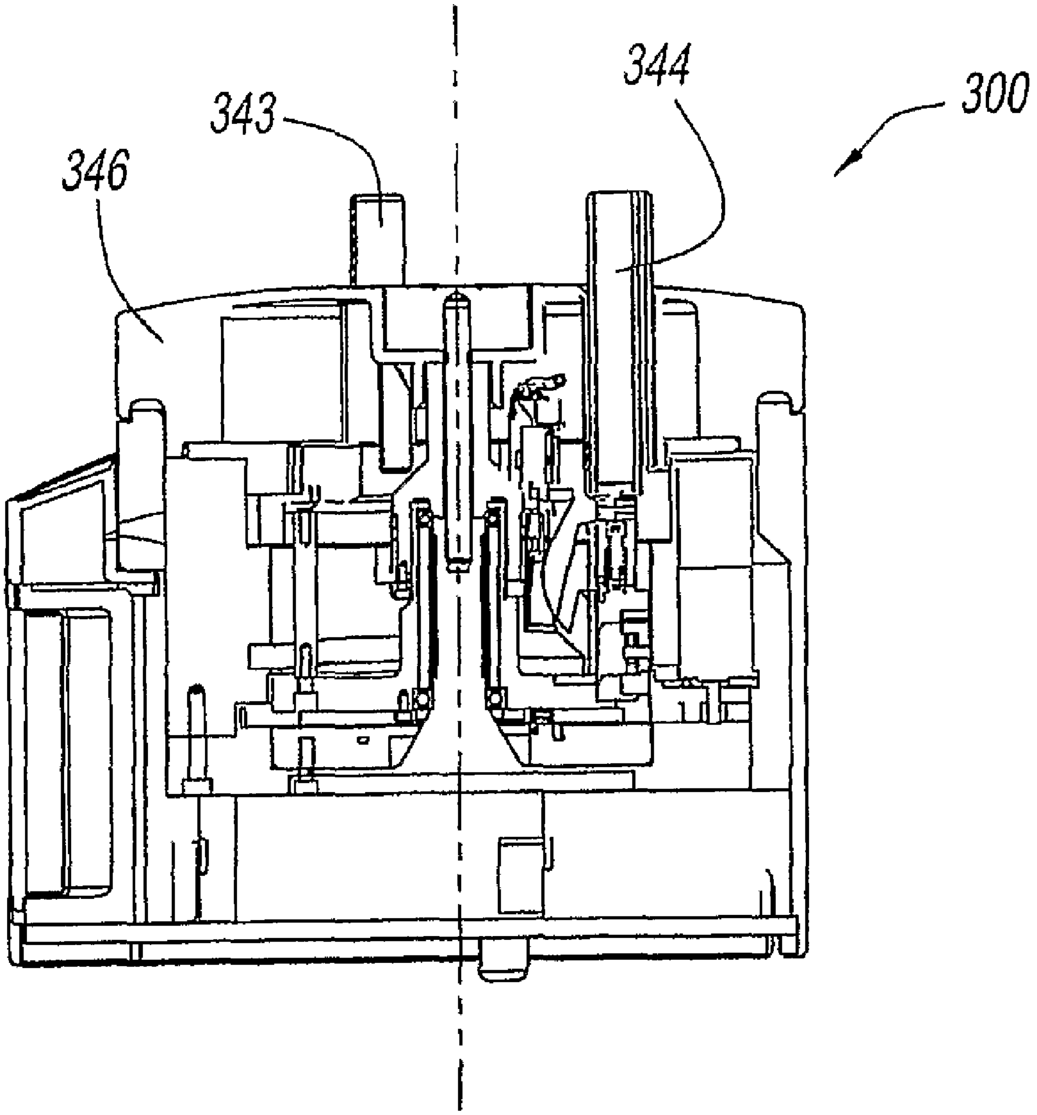
FIG. 37 is a vertical cross-sectional view, as would be seen along line X-X, of the assembly machine shown in FIG. 34.
Figure 47:
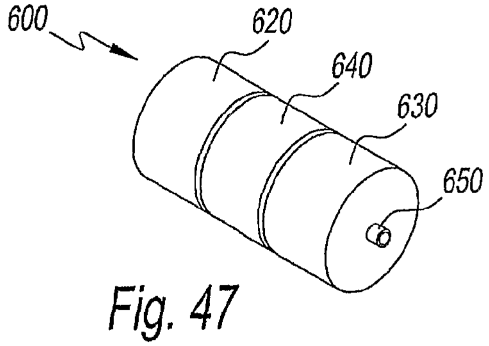
FIG. 47 is a perspective view of a third exemplary embodiment of a pharmaceutical or pharmaceutical-like product or assembly that can be assembled by the present disclosure.

As is shown in FIG. 32, one end of the rivet 2100 has a rounded edge 2105, to facilitate insertion into the tablets, while the opposing end 2110 is open to receive the rivet driver 232. The diameter of the rivet 2100 is similar to or slightly larger than that of the holes in the tablets, so that when assembled the friction caused by the fit between the rivet 2100 and the tablets is enough to hold the tablets together in an assembly. (An example of this embodiment is also shown in FIG. 47.) After the rivet 2100 is inserted into the tablets, the tablet assembly is pulled by driver base 234 to the left side of pusher block 220 and released into a receptacle (not shown) that can be collected by a user.

Figure 38:
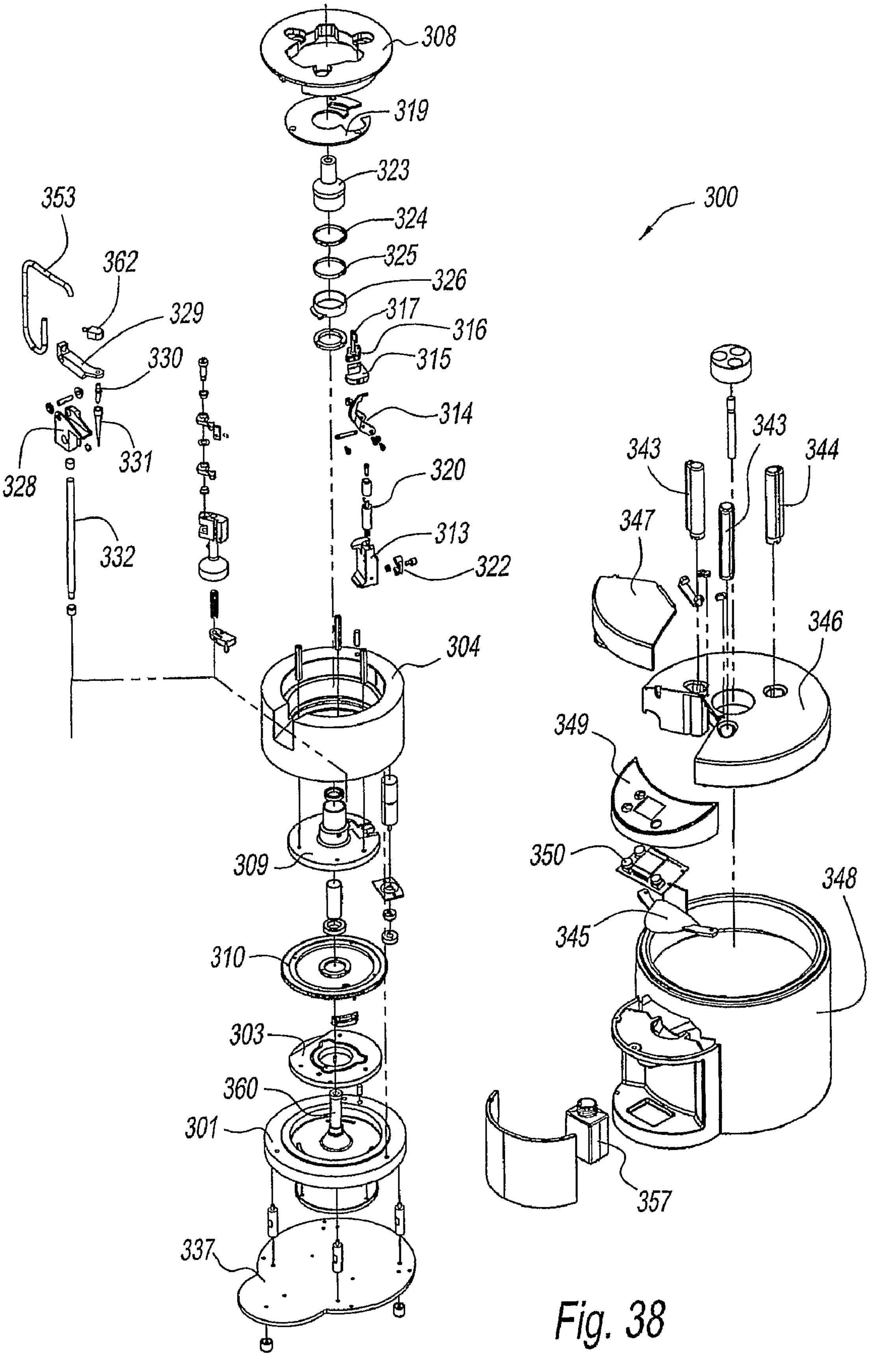
FIG. 38 is an exploded view of the assembly machine shown in FIG. 33.
Figure 39:
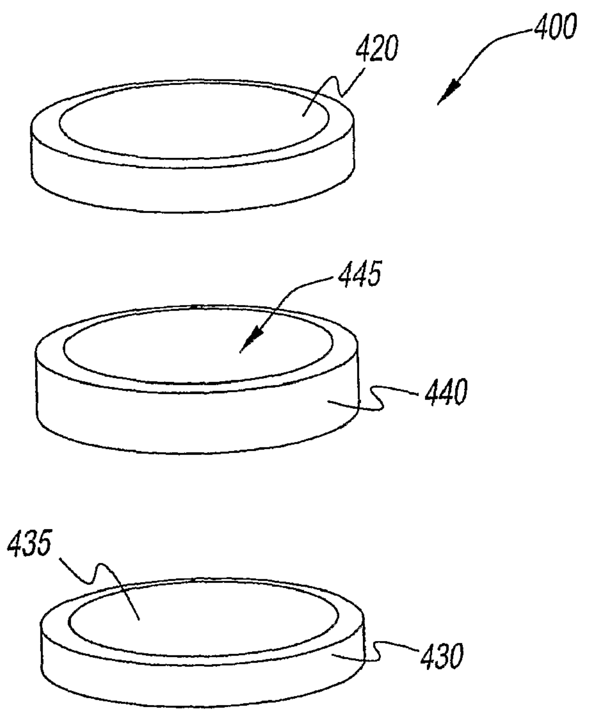
FIG. 39 is an exploded view of a first exemplary embodiment of a pharmaceutical or pharmaceutical-like product or assembly that can be assembled by the present disclosure.
Figure 40:
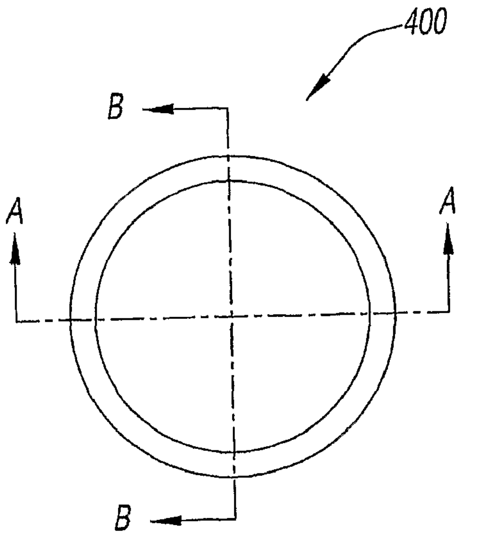
FIG. 40 is a top view of the assembly shown in FIG. 39.
Figure 41:
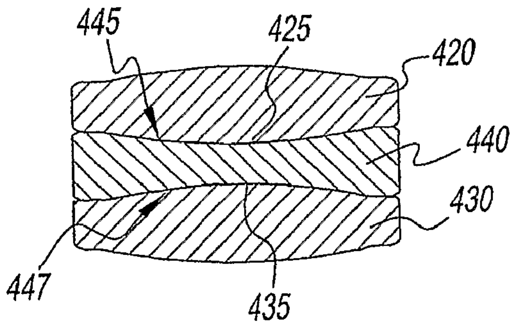
FIG. 41 is a first cross-sectional view, as would be seen along line A-A, of the assembly shown in FIG. 39.
Figure 42:
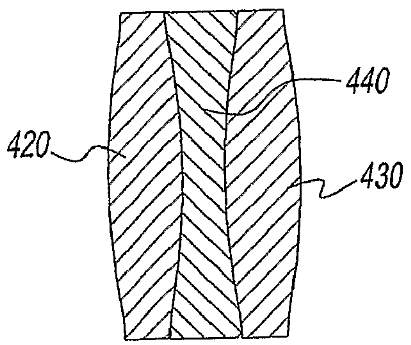
FIG. 42 is a second cross-sectional view, as would be seen along line B-B, of the assembly shown in FIG. 39.
Figure 43:
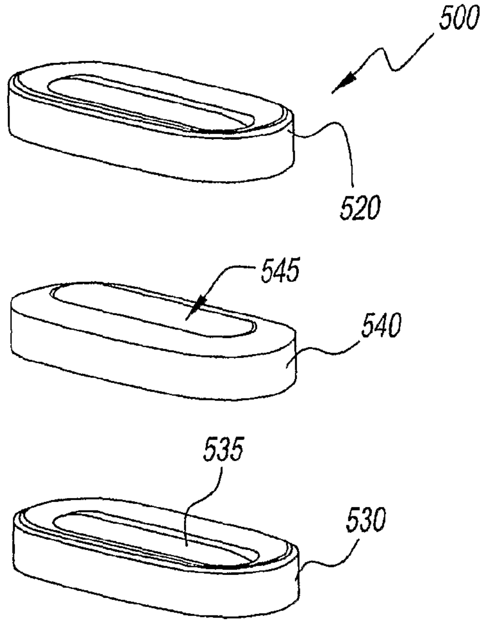
FIG. 43 is an exploded view of a second exemplary embodiment of a pharmaceutical or pharmaceutical-like product or assembly that can be assembled by the present disclosure.
Figure 44:
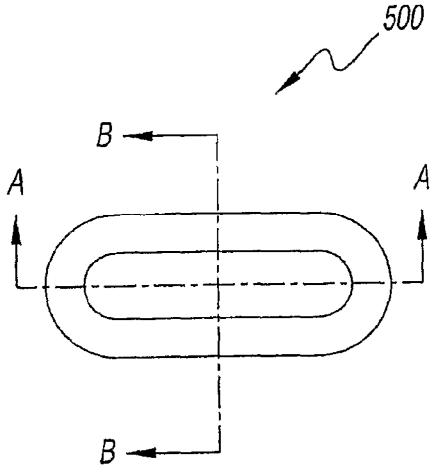
FIG. 44 is a top view of the assembly shown in FIG. 43.
Figure 45:
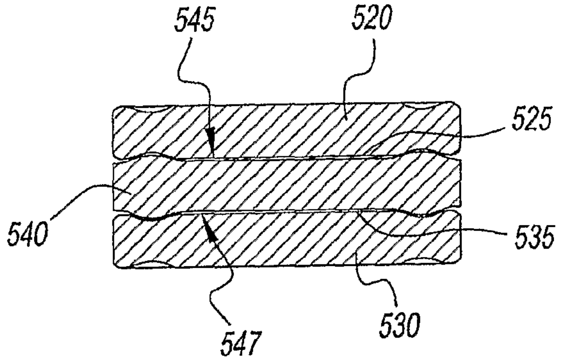
FIG. 45 is a first cross-sectional view of the assembly, as would be seen along line A-A, shown in FIG. 43.
Figure 46:
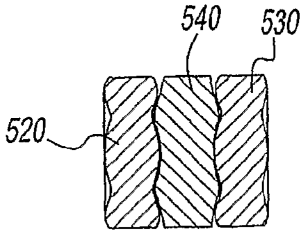
FIG. 46 is a second cross-sectional view of the assembly, as would be seen along line B-B, shown in FIG. 43.

Referring to FIGS. 33 through 38 and in particular FIG. 38, a fourth embodiment of the assembly machine of the present disclosure is shown, and generally referred to by reference number 300. At the beginning of the process, a user can fill the liquid bath 316 via the dispensing cavity in the lid 317. The bath is placed into the bath mount 315 in the rotating track 309 by opening the hinged top segment 347 in the hinged top cover 346. As with the above described embodiments, the bonding liquid used can be any edible bonding liquid capable of providing a strong bond between the tablets. The tablets can also be coated with a coating prior to being loaded in the magazines, which will function as a bonding agent when contacted with liquid.

Two front tablet magazines 343 and a rear tablet magazine 344 are loaded into the machine by inserting them into the relevant cavities in the top cover 346 and are supported by the cavities in the tablet track 308. In this embodiment, the tablets are stacked horizontally. A pipette tip 331 is fitted to the pipette fitting 330. The pill bottle 357 is inserted beneath the chute 345 in the protrusion in the shroud 348.

Once assembly machine 300 is connected to a power supply, the machine can be operated by buttons on the control PCB 350, which are protected by the control cap 349. The control PCB 350 has three membrane switches—"On," "Off," and "Reset," and a screen that sequentially displays the number of tablet assemblies completed. A total of 30 revolutions are completed currently, unless the cycle is interrupted by the user. Assembly machine 300 can be set to cycle to complete any number of tablet assemblies.

Upon operation of assembly machine 300, the rotating track 309 turns counter clockwise, and the piston assembly 320, which is connected to track 309, descends vertically to accommodate the first tablet element. The vertical position of piston assembly 320 is determined by the profile of cam track 304, to which it is operably engaged. In the shown embodiment, piston assembly 320 is engaged to cam track 304 through the track roller tenon assembly 322. Track roller tenon assembly 322 engages cam track 304 through a groove on the inside of cam track 304. Upon reaching the position of the first tablet magazine 343, a raised portion of the rotating post 313, which is operably connected to piston assembly 320, locates in a groove in the underside of the tablet track 308 and travels through a slot in the base of first tablet magazine 343. Tablet track 308 is stationary, and holds the tablet magazines 343 and 344 in place. The raised portion of rotating post 313 pushes the bottom tablet through a side opening of the tablet magazine 343 and the tablet is collected onto the piston assembly 320.

Assembly machine 300 also has a pipette tip 331 and a pipette lift rod 332, that are operably connected to rotating track 309, and a pipette cam track 303, which is disposed beneath cam track 304. This connection between pipette lift rod 332, rotating track 309, and pipette cam track 303 is such that pipette lift rod 332 is disposed in a hole on rotating track 309, and comes into contact with pipette cam track 303. Thus, as rotating track 309 rotates, pipette tip 331 is lowered by descent of the pipette lift rod 332, which follows the profile of pipette cam track 303. An aliquot of bonding liquid is collected by suction into the pipette tip via the aperture in lid 317. Suction is created in pipette tip 331 by compression of flex tube 353, which is connected to pipette holder 328 and adapter 329. Adapter 329 is connected to fitting 362 and pipette fitting 330, which are in turn connected to pipette tip 331. Flex tube 353 is compressed by engagement with intake nip track 324, which is stationary, and connected to central spindle 301 in the manner described below. Intake nip track 324 can have a protrusion disposed thereon so that flex tube 353 is compressed against this protrusion upon engagement with the protrusion. This displaces air within flex tube 353. The compression is released while pipette tip 331 is immersed in liquid bath 316, creating a suction that draws fluid into the pipette tip 331. Pipette lift rod 332, again following the profile of pipette cam track 303, then ascends, raising the pipette holder 328. Exhaust nip track 325 is also stationary, and also connected to central spindle 301 in the manner described below. Exhaust nip track 325 can have a plurality of protrusions disposed further along the rotational path of rotating track than the protrusions of intake track 324. A first protrusion on exhaust nip track 325 causes the rotation of pipette holder 328, so that pipette tip 331 is located above the center of the collected tablet element. The pipette lift rod 332 then descends, following the profile of pipette cam track 303, and second protrusion on exhaust nip track 325 compresses flex tube 353, causing a droplet to be dispensed onto the upper surface of the collected tablet.

The rotating track 309 continues to travel to position the piston assembly 320 below the second magazine 344. Piston assembly 320 is lowered further by cam shaft 304, and the second tablet element is collected from the second magazine 344 and placed on top of the first element, in the same manner as described above. Another aliquot of bonding liquid is then collected and dispensed onto the center of the upper surface of the second element, also in the same manner as described above. Further rotation of track 309 allows collection of the final tablet element and placement on top of the second element.

Assembly machine 300 also has pusher cam 326, which is stationary and connected to central spindle in the manner described below. A pusher blade 314, which is connected to rotating track 309, is moved radially outwards by pusher cam 326, so that the overhang of pusher blade 314 is above the assembled tablet. The tablet is then compressed against the underside of the pusher blade 314 by raising the piston assembly 320 and the tablet assembly disposed thereon. The pressure should be such that a good bond between the tablets is ensured.

Rotating track 309 is then rotated until rotating post 313 is adjacent to chute roof 345. The piston assembly 320 descends to relieve the compression, and the tablet assembly is ejected into the pill container 357 by further outward radial movement of the pusher blade 314.

Cam track 304 is stationary, and connected to a central spindle 301. Central spindle 301 is, in turn, connected to a base plate 337. Pipette cam track 303, also stationary, is connected to central spindle 301. Intake nip track 324, exhaust nip track 325, and pusher cam 326 are all connected to a dowel pin 360 that is connected to central spindle 301. Gear 310, which is disposed above pipette cam track 303, is operably connected to a motor assembly 305. In the shown embodiment, this connection is with a drive gear 306. Rotating track 309 is also operably connected to gear 310, such as with bearings, to effect the movements of rotating track described above. Motor assembly 305 can be operably connected to a power supply, such as an electrical power source or a battery.

The present disclosure also contemplates the use of an RFID and bar code reader system with assembly machine 300, similar to those of the previous embodiments of the assembly machines described above. The bar code system would read a bar code off of the bottle 357 and report prescription information to a central processor. The processor would then upload tablet assembly information from a central database. RFID readers could be employed to read RFID tags located on the tablet magazines 343 and 344, thus ensuring that the correct magazines were inserted by the user and preventing operation of the assembly machine when the incorrect magazines are used.

In addition, in all of the above described embodiments of the assembly machines, the present disclosure contemplates the use of sensors to detect that a complete tablet assembly has been formed. These sensors can be located on the assembly machines near where the completed tablet assembly is ejected from the machine. The sensors could use either dimensional or mass calculations to determine that the tablet assembly is complete. For example, to measure the mass of the tablet assembly, a load cell could be used. Since the masses involved in measuring the assemblies would be small, a strain gauge would be preferable. Semiconductor strain gauges, foil gauges, or piezoelectric devices may be used as the sensing element. The gauge used can determine the mass of the tablet via either shear, compression, or tension forces.

Measuring of the completed tablet assembly can also be accomplished with optical, acoustic, or physical sensing element technology. Light-based measuring devices can employ photoelectric presence sensors based on transmittance or reflectance to detect the presence of the uppermost element of the tablet assembly. These optical sensors can use, for example, laser, LED, infrared and fiber optic technologies. Alternatively, charged couple devices (CCDs) can be employed to compare acquired image data against acceptable limits. Acoustic devices, primarily ultrasound, can measure the time of flight of reflected sound to determine a correctly made tablet assembly. Physical sensing may be performed using a displaceable sensor element or a touch probe positioned to make contact with the uppermost tablet element.

Referring to FIGS. 39 through 42, a first example of a product or tablet assembly that can be assembled by the exemplary embodiments described herein is shown, and referred to by reference numeral 400. Tablet assembly 400 has top component 420, bottom component 430, and middle component 440, which can all have different active agents and can have differing release rates. Top component 420 can have a convex bottom edge 425, and middle component 440 can have an upper concave edge 445, to facilitate assembly and adhesion between the two components. Middle component 440 can also have lower concave edge 447, and bottom component 430 can have a convex upper edge 435, to likewise facilitate assembly and adhesion between the two components.

Referring to FIGS. 43 through 46, a second example of a product or tablet assembly that can be assembled by the exemplary embodiments described herein is shown, and referred to by reference numeral 500. Tablet assembly 500 has top component 520, bottom component 530, and middle component 540, which can all have different active agents and can have differing release rates. Top component 520 can have a curved bottom edge 525, and middle component 540 can have a curved upper edge 545, to facilitate assembly and adhesion between the two components. Middle component 540 can also have a lower curved edge 547, and bottom component 530 can have a curved upper edge 535, to likewise facilitate assembly and adhesion between the two components.

Referring to FIG. 47, a third example of the tablet assemblies that can be assembled by the exemplary embodiments described herein (specifically assembly machine 210) is shown, and referred to by reference numeral 600. Tablet assembly 600 has upper component 620, bottom component 630, and middle component 640 which can all have different active agents and can have differing release rates. The three components are held together with rivet 650 (similar to rivet 2100 described above), which is inserted into holes through the center of each component. Rivet 650 has a rounded front end to facilitate insertion, and the diameter is slightly larger than that of the holes through the tablet components, so that a friction fit holds the assembly together.

The above examples of product or tablet assemblies are meant to be illustrative of the many kinds of tablet assemblies that the assembly machine of the present disclosure can assemble. In addition to those shown in FIGS. 39 through 47, the assembly machines of the present disclosure can be adapted to form a variety of different kinds of assemblies made from a variety of tablet shapes and sizes. It should be further understood that features from one of the exemplary embodiments may be used with features from the other exemplary embodiments.

This application is related to the following co-pending applications, the disclosures of which are hereby incorporated by reference in their entirety: U.S. Provisional Application No. 60/629,876, filed Nov. 19, 2004 and U.S. Provisional Application No. 60/631,923, filed Nov. 30, 2004. This application is also related to U.S. Patent Application Publication No. 2006/0141001, entitled "PHARMACEUTICAL PRODUCT", filed on Nov. 18, 2005, and which claims priority to U.S. Provisional Application Ser. No. 60/661,552, filed Mar. 14, 2005, and U.S. Provisional Application Ser. No. 60/629,828, filed Nov. 19, 2004, the disclosures of which are all incorporated herein by reference.

The assembly machines of the present disclosure having been thus described with particular reference to the preferred forms thereof, it will be obvious that various changes and modifications may be made therein without departing from the spirit and scope of the present disclosure as defined herein.

The above description fully discloses the assembly machines of the present disclosure including preferred embodiments thereof. Modifications and improvements of the embodiments specifically disclosed herein are within the scope of the following claims. Without further elaboration, it is believed that one skilled in the area can, using the preceding description, utilise the present disclosure to its fullest extent. Therefore, the examples herein are to be construed as merely illustrative and not a limitation of the scope of the present disclosure in any way. The embodiments of the disclosure in which an exclusive property or privilege is claimed are defined as follows.

What is claimed is:

1. An apparatus for assembling a pharmaceutical product having at least three independently formed solid tablets, the apparatus comprising:

at least three component magazines, each holding at least one of said solid tablets;

a pusher assembly in communication with said at least three component magazines, wherein said pusher assembly comprises a single reciprocating pusher that retracts to release the solid tablets from all of said component magazines, and wherein said single reciprocating pusher positions all of the solid tablets that are dispensed from said at least three component magazines; and a connector assembly in communication with the pusher assembly for connecting the solid tablets from each of said at least three component magazines together, to form the pharmaceutical product.

2. The apparatus of claim 1, wherein the apparatus comprises only three component magazines.

3. The apparatus of claim 2, wherein the connector assembly comprises:

a sprayer that applies a bonding liquid to at least one of the solid tablets that are dispensed from each of said component magazines and one or more compression pins for pressing the solid tablets together.

4. The apparatus of claim 3, wherein said bonding liquid is selected from the group consisting of water, alcohol, polyethylene glycol, glycerine, polyethylene oxide polymers, methylcellulose, methylcellulose derivatives, hydroxypropylmethylcellulose, hydroxyethylcellulose, ethylcellulose, or any combinations or mixtures thereof.

5. The apparatus of claim 2, wherein the connector assembly comprises:

a rivet dispenser and a rivet driver in communication with said rivet dispenser, wherein said rivet driver positions a rivet in a hole in each of the solid tablets that are dispensed from each of said component magazines to provide a mechanical connection for the solid tablets.

6. The apparatus of claim 3, wherein said sprayer comprises a solenoid pump that is operably connected to a supply of said bonding liquid, wherein said solenoid pump is actuatable to draw bonding liquid from said bonding liquid supply, and to pass it to a dispenser for application to at least one solid component.

7. The apparatus of claim 2, wherein said connector assembly comprises:

a confining bracket for receiving and confining the solid tablets in an aligned orientation, and at least two opposed compression pins, each of the at least two compression pins to apply pressure to an opposed end of the aligned solid tablets.

8. The apparatus of claim 3, further comprising:

a microprocessor;

at least one data collection device; and an interface, wherein said microprocessor and said data collection device are in electronic communication with said interface.

9. The apparatus of claim 8, wherein said data collection device comprises a radio frequency identification (RFID) system and a bar code reader, wherein said RFID system and said bar code reader system are each independently in electronic communication with said interface.

10. The apparatus of claim 9, wherein said component magazines have RFID tags disposed thereon, said tags containing information about the solid tablets disposed within said component magazines, wherein said RFID system comprises an antenna, a module, and an interface, which are all in electronic communication with each other, and with said interface, and wherein said antenna reads said information from said RFID tags and communicates said information to said interface.

11. The apparatus of claim 10, wherein said bar code reader is in electronic communication with said interface, and wherein said bar code reader reads a bar code from a collection device placed in the front of said apparatus to collect said pharmaceutical product, and communicates said bar code to said interface.

12. The apparatus of claim 11, wherein said interface comprises a software program embedded therein, whereby said software program compares the information communicated from said bar code reader and said RFID system, to ensure that said component magazines are correct for placement within said apparatus.

13. The apparatus of claim 1, wherein said solid tablets are selected from the group consisting of circular and elliptical tablets.

14. An apparatus for assembling a pharmaceutical product having at least three independently formed solid tablets, the apparatus comprising:

at least three component magazines each holding at least one of said solid tablets;

a track assembly in communication with said at least three component magazines for positioning the plurality of said tablets that are dispensed from said at least three component magazines; and a connector assembly in communication with the track assembly for connecting one of the plurality of said tablets from each of said at least three component magazines together, to form the pharmaceutical product, wherein said track assembly comprises a rotating track, a rotating post, and a piston assembly, all operably connected to each other, so that upon rotation of said rotating track, said rotating post removes one of said solid tablets from each of said component magazines, so that the solid tablets are on said piston assembly.

15. The apparatus of claim 14, wherein the apparatus comprises only three component magazines.

16. The apparatus of claim 15, further comprising a pipette assembly that applies a bonding liquid to at least one of the plurality of said solid tablets.

17. The apparatus of claim 14, wherein said track assembly further comprises a cam track that is operably connected to said piston assembly, so that upon rotation of said rotating track, said cam track alternatively lowers and raises said piston assembly.

18. The apparatus of claim 17, wherein said track assembly further comprises a pipette cam track that is operably connected to said pipette assembly, so that upon rotation of said rotating track, said pipette cam track alternatively lowers and raises said pipette assembly.

19. The apparatus of claim 18, wherein said connector assembly comprises a pusher blade that is operably connected to said cam track and said piston assembly, so that the pharmaceutical product is compressed under said pusher blade by said piston assembly after the plurality of said solid tablets have been collected from said component magazines.

20. The apparatus of claim 15, further comprising a user interface that is operably connected to said at least three magazines, said track assembly, and said connector assembly, so that said user interface sets the number of said pharmaceutical tablets to be assembled.

* * * * *